(12) United States Patent
Parry-Jones et al.

(10) Patent No.: US 8,723,759 B2
(45) Date of Patent: May 13, 2014

(54) DISPLAY WITH LIGHT CONCENTRATING SUBSTRATE

(75) Inventors: Lesley Anne Parry-Jones, Oxford (GB); Alistair Paul Curd, High Wycombe (GB)

(73) Assignee: Sharp Kabushiki Kaisha, Osaka (JP)

( * ) Notice: Subject to any disclaimer, the term of this patent is extended or adjusted under 35 U.S.C. 154(b) by 774 days.

(21) Appl. No.: 12/821,234

(22) Filed: Jun. 23, 2010

(65) Prior Publication Data

US 2011/0316764 A1 Dec. 29, 2011

(51) Int. Cl.
*G09G 3/28* (2013.01)
(52) U.S. Cl.
USPC .................................................. 345/60
(58) Field of Classification Search
CPC ........................................ G09G 3/28
USPC .............. 345/60, 64, 71, 102; 349/61, 106; 359/276, 296, 226.3
See application file for complete search history.

(56) References Cited

U.S. PATENT DOCUMENTS

| | | | | |
|---|---|---|---|---|
| 7,339,639 B2* | 3/2008 | Nakano et al. | ............... | 349/106 |
| 7,359,108 B2 | 4/2008 | Hayes et al. | | |
| 7,518,593 B2* | 4/2009 | Daiku | ............... | 345/102 |
| 7,548,363 B2* | 6/2009 | Hayes et al. | ............... | 359/276 |
| 7,616,368 B2 | 11/2009 | Hagood | | |
| 7,852,547 B2* | 12/2010 | Kim | ............... | 359/296 |
| 7,978,255 B2* | 7/2011 | Suzuki | ............... | 348/350 |
| 8,139,024 B2* | 3/2012 | Daiku | ............... | 345/102 |
| 8,376,601 B2* | 2/2013 | Yashiro | ............... | 362/606 |
| 2004/0114066 A1 | 6/2004 | Takeuchi et al. | | |
| 2005/0128370 A1 | 6/2005 | Moon | | |
| 2007/0127108 A1 | 6/2007 | Hayes et al. | | |
| 2007/0188676 A1 | 8/2007 | Choi et al. | | |
| 2008/0084551 A1* | 4/2008 | Harnisch | ............... | 356/4.01 |
| 2008/0130087 A1 | 6/2008 | Miyata et al. | | |
| 2008/0198292 A1* | 8/2008 | Marra et al. | ............... | 349/61 |
| 2009/0046082 A1 | 2/2009 | Jacobson et al. | | |

(Continued)

FOREIGN PATENT DOCUMENTS

JP 2004-184792 A 7/2004
JP 2005-173605 A 6/2005

(Continued)

OTHER PUBLICATIONS

International Search Report and Written Opinion for corresponding International Application No. PCT/JP2011/060615 mailed Jul. 12, 2011.

(Continued)

*Primary Examiner* — Fred Tzeng
(74) *Attorney, Agent, or Firm* — Renner, Otto, Boisselle & Sklar, LLP

(57) ABSTRACT

A display which includes an array of pixels. Each pixel includes a hydrophobic layer; an electro-wetting fluid adjacent the hydrophobic layer, the electro-wetting fluid including at least first and second fluids immiscible with each other and having different polar properties and different optical properties; and at least one electrode wherein application of a voltage to the electrode alters a wetting effect of the electro-wetting fluid on the hydrophobic layer in a light-modulating area of the pixel. The display further includes a light-concentrating substrate including an array of light-concentrating structures each configured to concentrate light onto the light-modulating area of a corresponding one or more pixels within the array of pixels.

23 Claims, 22 Drawing Sheets

(56) References Cited

U.S. PATENT DOCUMENTS

| | | | |
|---|---|---|---|
| 2009/0141501 A1* | 6/2009 | Mukawa | 362/296.1 |
| 2009/0195850 A1* | 8/2009 | Takahashi | 359/226.3 |
| 2009/0289968 A1* | 11/2009 | Yoshida | 345/691 |

FOREIGN PATENT DOCUMENTS

| | | |
|---|---|---|
| JP | 2007-219510 A | 8/2007 |
| JP | 2009-294246 A | 12/2009 |
| WO | 03/071347 A1 | 8/2003 |
| WO | 2007/069179 A2 | 6/2007 |
| WO | 2008/122921 A1 | 10/2008 |
| WO | 2009/036272 A1 | 3/2009 |

OTHER PUBLICATIONS

U.S. Appl. No. 12/637,846, filed Dec. 15, 2009 cited on p. 40, line 1 of the specification.

* cited by examiner (a)

(b)

(a)

(b)

(a)

(b)

(a)

(b)

(a)

(b)

(a)

(b)

(a) Hexagonal Light-Concentrating Structure (i) RGB  (ii) RGBW (b) Square Light-Concentrating Structure (i) RGB

| R | G | B | R |
|---|---|---|---|
| B | R | G | B |
| G | B | R | G |

(ii) RGBW

| R | G | R | G |
|---|---|---|---|
| B | W | B | W |
| R | G | R | G |

(c) Two-dimensional Light-Concentrating Structure (i) RGB

| R | G | B | R |
|---|---|---|---|

(ii) RGBW

| R | G | B | W |
|---|---|---|---|

(d) Two-dimensional Light-Concentrating Structure (alternative)

(i) RGB

| R | R | R | R |
|---|---|---|---|
| G | G | G | G |
| B | B | B | B |
| R | R | R | R |
| G | G | G | G |

(ii) RGBW

| R | R | R | R |
|---|---|---|---|
| G | G | G | G |
| B | B | B | B |
| W | W | W | W |
| R | R | R | R |

DISPLAY WITH LIGHT CONCENTRATING SUBSTRATE

TECHNICAL FIELD

The present invention relates to displays in which the reflective or transmissive image brightness is enhanced by the use of light concentrating structures which are used to focus or concentrate either ambient light or light from a front or backlight onto the light-modulating areas of the display. As an example, the present invention relates to a reflective display in which light concentrating structures are used to focus or concentrate the ambient light onto the light-modulating areas of the display to enhance the image brightness.

BACKGROUND ART

Many electronic display devices that we are familiar with are emissive, for example laptop screens, desktop monitors and televisions. Such devices, whilst highly visible indoors, are hard to see in bright (particularly outdoor) conditions. Additionally, such devices are often power-hungry due to the need to generate light either via a backlight in the case of liquid crystal displays (LCDs) or within the display itself in the case of cathode ray tubes (CRTs) or organic light emitting displays (OLEDS).

An alternative to such emissive displays is to use a reflective display, in which the image is generated by modulating the intensity of the reflected ambient light. Such displays have the advantage of working with (rather than competing against) the strength of the ambient light, and hence are a good solution for displays which are used primarily in bright conditions. They also tend to have much lower power consumption, because there is no light generation involved. If necessary, the display can also be fitted with a front-light (which provides illumination from the front surface of the display) so that it can be read in darker environments also. LCDs are notoriously inefficient when used in either transmissive or reflective mode, due to the losses involved in the polarisers, colour filters and black mask in the display structure. When used in transmission, a high brightness display can nonetheless be achieved by using a bright backlight, but this comes at the cost of high power consumption. When used in reflective mode, however, these inefficiencies result in a low reflectivity and as a result poor image brightness, much less than the brightness that would be achieved from the ultimate reflective display: paper.

In recent years, monochrome alternatives to reflective LCDs have emerged onto the market-place, the most commonplace being E-Ink technology. This has been used primarily to make monochrome e-book readers, such as the Amazon Kindle®. The white state reflectivity of such e-books is around 35-40% which, whilst comparable with newspaper, still falls short of the reflectivity from a quality white piece of paper. A more recent emerging technology is the Mirasol® display from Qualcomm MEMS Technologies, which uses an interference-based MEMS method to generate a switch between pixels which appear either black or green. Qualcomm claim 45% reflectivity in these displays which they term "bichrome" because the bright state is green rather than white.

These emerging technologies, whilst perhaps beginning to out-perform monochrome active-matrix LCDs, are still not reflective enough to be able to generate a high reflectivity colour image. To create a colour image, E-Ink would simply need to add colour filters to their display, which would cut the white state reflectivity down by about ⅓ to around 11-13%. Qualcomm claim to have a colour version of their Mirasol® display which works not by having colour filters as such, but nonetheless by having coloured sub-pixels which (in their bright state) reflect either red, green or blue. Their projected white state reflectivity for such displays is 25%, which would be the highest reflectivity colour display on the market today.

However, whilst this performance is impressive, it still falls rather short of the white state reflectivity we are accustomed to in printed colour images on paper (~60-70%). One technology which has the potential to achieve this target is that of electrowetting.

The term electrowetting refers to the voltage dependent wetting of a droplet of fluid on a surface, and can be used to manipulate small droplets of fluid. It has been applied to make variable focus lenses by Varioptic, and is also being developed for "lab-on-a-chip" applications that involve moving very small quantities of biological fluid around in a single plane. It can also be used for making displays, and there is a plethora of different ways in which this can be realised.

Perhaps the simplest way of creating an electro-wetting display is illustrated in FIGS. 1($a$) and 1($b$). A lower substrate 1$a$ has a series of electrodes 2 which could be either transparent or reflective, according to whether the display is intended to be transmissive or reflective. On-top of the electrodes 2 is a transparent dielectric insulating layer 3 and a transparent hydrophobic layer 4. Spaced apart, and positioned above and parallel to the lower substrate 1$a$ is an upper substrate 1$b$, with a uniform transparent electrode 5 and another hydrophobic layer 4. The two substrates sandwich a fluid layer which includes two different types of fluid which are immiscible with each other: these are the electrowetting fluids 6 and 7. One of these is fluid 6, a non-polar fluid such an oil (e.g. dodecane). The other is fluid 7, a polar fluid such as a weak solution of ions (e.g. KCl) in water or a mixture of water and ethyl-alcohol. The fluids are dispensed so that the polar fluid 7 consists of droplets that are substantially equal or slightly greater in area to the size of the electrodes 2, and positioned at every other electrode 2, as shown in FIG. 1($a$). One of the fluids is transparent, and the other is coloured with a dye, often black. In this illustrative example, the polar fluid 7 will be black and the non-polar fluid 6 will be transparent. In the case of the example illustrated in FIGS. 1($a$) and 1($b$), each pixel 21 includes two electrodes 2$a$ and 2$b$ and the pixels 21 are arranged in an array of rows and columns as is conventional. Each pixel 21 also includes a black mask 8 which obscures some of the pixel 21 from a viewer 9, in this case, at least the part of the pixel 21 that is defined by electrode 2$a$. When a voltage is applied between electrodes 2$a$ and 5, the electrowetting effect causes the fluid 7 to move so that it is adjacent to electrode 2$a$. When the voltage is removed, the droplet of fluid 7 should remain in this position as represented in FIG. 1($a$). In this state, the droplet of fluid 7 is obscured by the black mask 8 from the viewer 9, and the viewer will see either the reflection from the electrode 2$b$ in the case that the electrode 2$b$ is reflective, or light from a backlight 10 in the case that the electrode 2$b$ is transparent, i.e. this corresponds to the bright state of the display. If the voltage is now applied between electrodes 2$b$ and 5 instead, the droplet of fluid 7 will now move so that it is adjacent to electrode 2$b$, and when the voltage is removed, it should remain in this position as represented in FIG. 1($b$). In this state, the droplet of fluid 7 is now visible to the viewer 9, and since it is black, that pixel 21 will now appear dark, in either the case of a transmissive or a reflective display.

The problem with this very simple display is that a large portion of the surface area of the display (at least 50%) is covered with the black mask 8, and hence the brightness of the white state is very limited. An alternative scheme is described in US 2007/0127108 A1 (R. Hayes et al.; published Jun. 7, 2007), and illustrated in FIGS. 2(a) and 2(b). The structure of the device is very similar to that shown in FIGS. 1(a)-1(b), except that the upper substrate 1b does not have a hydrophobic surface, so that when no voltage is applied, the polar fluid 7 lies above a layer of the non-polar fluid 6 which wets the hydrophobic surface 4 on the lower substrate 1a. When a voltage is applied between the upper (5) and lower (2) electrodes, the polar fluid 7 now tries to wet the hydrophobic surface 4, causing the non-polar fluid 6 to break up into small droplets that occupy a much smaller area of the display substrate. If in this example the polar fluid 7 is transparent, and the non-polar fluid 6 is black (as illustrated in FIGS. 2(a)-2(b)), then in the voltage-off state, the pixel 21 will appear black as represented in FIG. 2(a), and in the voltage-on state the pixel 21 will appear almost completely transparent or completely reflective (depending on whether the rear electrode 2 is transparent or reflective) apart from the areas which are still occupied by the black, non-polar fluid 6, as represented in FIG. 2(b). This will correspond to the bright state whether the device is being operated in reflective or transmissive mode. It is apparent from the fact that the non-polar fluid 6 is made to "bunch-up" rather than translate sideways as in the previous mode, that this mode of operation offers a much better aperture ratio (as evidenced by the smaller area of black mask 8 in FIG. 2(b)), and therefore potentially a much higher brightness in the bright state. However, the aperture ratio is still limited by two factors. One is that the residual area occupied by the black fluid 6 is dependent on the voltage applied: the higher the voltage, the lower the residual area. However, because there will always be a maximum voltage that can be applied, the residual area will always be larger than the theoretical minimum. The other reason is that in practice it is necessary to use a pixel wall structure 24 in order to both separate the black fluid in one pixel from that in its neighbour, and in order to create a "seed" which will determine how the non-polar fluid layer breaks up into multiple smaller droplets. The effect of the pixel walls 24 is to further increase the unusable area of the pixel, reducing the aperture ratio. Current state-of-the-art aperture ratios are around 42% for this type of electrowetting display.

This last electrowetting display mode is currently being used by Philips spin-out company Liquavista to create monochrome and colour reflective display demonstrators capable of displaying video rate images. It has the distinct advantage over LCDs that it is polariser-free, and hence there is not the immediate 50% loss in brightness associated with absorbing one polarisation of the ambient light. However, as explained above, the current aperture ratios are of the order of 42%, leading to an overall white state reflectivity of just 37%, which is actually less than that normally available with LCDs. The reason for this is that although LCDs lose around 50% from the polariser, the aperture ratio for reflective LCDs is extremely good, usually at least 90-95%. This is not to be confused with the (rather lower) aperture ratios that can be achieved in transmissive LCDs. In this case the thin-film-transistors (TFTs) needed to drive each pixel of the display compete for space with the active area of each pixel, and therefore limit the aperture ratio. In a reflective LCD, however, the TFTs can be positioned underneath the pixel electrode, and the light never reaches them, hence the pixel electrode can occupy almost all of the available space dedicated to each pixel. It is only if the effective aperture ratios can be significantly improved that the white state reflectivity of electrowetting displays will begin to compete with and overtake that of reflective LCDs.

There are many ways in which the aperture ratio of electrowetting displays can be improved. For example WO2009/036272 A1 (J. Heikenfeld et al.; published Mar. 19, 2009) and US2008130087 A1 (A. Miyata et al., published Jun. 5, 2008) describe a way for improving the aperture ratio by moving one of the fluids into a vertical reservoir which reduces the area taken up by the fluid when not in "on display". The authors of WO2009/036272 A1 claim aperture ratios of up to 95% should be possible. A second way of improving aperture ratio is to use a lower horizontal layer as a reservoir instead of a vertical channel, as described in U.S. Pat. No. 7,359,108 B2 (R. Hayes et al., issued Apr. 15, 2008). This arrangement has the advantage of bistability, however the time taken for the fluid to move from one layer to another can be quite large, resulting in poor switching speeds. A further, simpler method, which would potentially have an excellent aperture ratio is disclosed in US2009/0046082 A1 (J. Jacobson et al., published Feb. 19, 2009) and is simply to include two electrowetting fluid layers within the display, one on-top of the other, with electrodes and dielectric layers on both substrates. This is a bistable system where either the polar fluid or the non-polar fluid can be the upper layer, depending on which electrode has most recent had voltage applied to it, with reference to the polar fluid. It seems likely that this would require a relatively high switching voltage to go from one state to the other. These last two methods can also be applied only to reflective displays, whereas all of the previous examples were applicable to both transmissive and reflective displays.

The electrowetting geometries discussed so far are in the context of a monochrome or single colour display. In order to generate a colour display from any of these methods, they would require the addition of additive spatial colour filters (such as the traditional red, green, blue (RGB) system) to a monochrome display, which would further reduce the white state reflectivity by a factor of approximately 2 or 3, depending on whether a RGBW or RBG colour scheme is employed, respectively.

An alternative to creating a colour display by using additive spatial colour filters to a monochrome display (which is very wasteful in terms of brightness) is to make multi-layered cells using coloured (instead of black) dyes so that a subtractive technique can be used to create coloured pixels. This technique can be used with 3 or 4 electrowetting layers (e.g. cyan, yellow, magenta and an optional black layer) as disclosed in WO2003/071347 A1 (B. Feenstra et al., published Aug. 28, 2003) and U.S. Pat. No. 7,359,108 B2. The principle difficulty with this type of approach is that the individual layers must be positioned very close to each other (in the direction of the display normal), otherwise there is parallax between the various layers, and a blurred, colour separated or otherwise low-quality image is formed. Although significant advances in this field have been made recently using very thin, plastic substrates, these have generally been for non-pixelated colour changing elements, or used passive matrix addressing. It would therefore be timely to find a way in which to improve the effective aperture ratio of single-layer electrowetting devices.

WO2007/069179 A2 (S. Roosendaal et al., published Jun. 21, 2007) describes a method for improving the brightness of reflective displays by incorporating a wide-angle scatterer into the inactive portions of the display. The idea is that if the ambient light which strikes this surface is scattered out at a large angle, then some will not immediately escape the display due to the high to low refractive index change at the top surface of the display, i.e. it will be totally internally reflected. This would be a way of improving the brightness of the display, however the contrast ratio will be compromised because some of the light scattered from the in-active portions of the display will not be totally-internally-reflected and therefore exit the display directly.

WO 2008/122921 A1 (S. Roosendaal et al., published Oct. 16, 2008) describes an alternative method for improving the brightness of reflective displays by the addition of an external film on-top of the display. The additional film incorporates reflective or refractive structures intended to redirect the ambient light towards the active area of the pixel. However, because the redirecting structures are distant from the pixels (by the thickness of the top substrate of the display), such structures are unlikely to be effective over a large range of angles of incident light and/or viewing angle. In practice it is necessary to place the redirecting structures in very close proximity to the image-forming part of the display, in order to obtain good optical contrast.

U.S. Pat. No. 7,616,368 B2 (N. Hagood; issued Nov. 10, 2009) describes exactly just such an arrangement, where the redirecting structures are shaped like compound parabolic concentrator (CPC) or other light-concentrating structures, and placed in close proximity to the pixels of a microelectromechanical system (MEMS) in-plane-shutter style display. The purpose of the light-concentrating structures is as described above: to redirect the ambient light towards the active area of the pixel, in order to avoid light absorption by the other parts of the pixel which would normally be covered by black mask.

SUMMARY OF INVENTION

The present invention relates to a display in which there is a light-concentrating structure incorporated into the upper substrate of the display, the purpose of which is to channel all, or nearly all, of the ambient light into certain areas within each pixel of the display. The light-concentrating structure may be made up of a compound parabolic concentrator (CPC) or another type/shape of light-concentrating structure. One of the aspects of the present invention that distinguish it from the prior art (in particular U.S. Pat. No. 7,616,368 B2) is that in some embodiments the light-concentrating structures are elongated in one direction so that they form continuous stripes along each row (or column) of pixels, rather than there being one light-concentrating structure per pixel. Another aspect is that the light-concentrating structures can be truncated compound parabolic concentrator structures, and they can work via refractive rather than just reflective surfaces. A further aspect is that the display mode used underneath the structure is an electrowetting display. A further aspect of the invention is that it can also be used to improve the efficiency of reflective, transmissive and transflective electrowetting displays.

According to one aspect of the invention, a display is provided which includes an array of pixels. Each pixel includes a hydrophobic layer; an electro-wetting fluid adjacent the hydrophobic layer, the electro-wetting fluid including at least first and second fluids immiscible with each other and having different polar properties and different optical properties; and at least one electrode wherein application of a voltage to the electrode alters a wetting effect of the electro-wetting fluid on the hydrophobic layer in a light-modulating area of the pixel. The display further includes a light-concentrating substrate including an array of light-concentrating structures each configured to concentrate light onto the light-modulating area of a corresponding one or more pixels within the array of pixels.

In accordance with a particular aspect, a base of each light-concentrating structure defines the light-modulating area of the corresponding one or more pixels within the array of pixels, and the at least one electrode is configured to control whether at least one of the first and second fluids is positioned within the light-modulating area of the pixel or in a space between the light-modulating area of the pixel and the light modulating area of an adjacent pixel.

According to another particular aspect, a voltage applied to the at least one electrode causes lateral motion of the first and second fluids between the light-modulating areas of the pixel or the space between the light-modulating area of the pixel and the light modulating area of an adjacent pixel.

In accordance with yet another aspect, a voltage applied to the at least one electrode causes one of the first and second fluids to consolidate by occupying less area within the plane of the display in the light-modulating area.

According to another aspect, a space between the base of each light-concentrating structure and the base of an adjacent light-concentrating structure within the array of light-concentrating structures includes a vertical recess providing for non-planar motion of the electro-wetting fluid of corresponding pixels between the adjacent light-concentrating structures.

In accordance with another aspect, the pixels each include a mesa structure at the top of which is the light-modulating area, and a vertical reservoir is formed by a gap between the mesa structure and a mesa structure of an adjacent pixel within the array of pixels; and the gap between the mesa structures of the adjacent pixels is located directly underneath the space between the bases of the light-concentrating structures corresponding to the adjacent pixels, and provides for non-planar motion of the electro-wetting fluid between the mesa structures of the adjacent pixels.

According to yet another aspect, the light-concentrating structures are two-dimensional light-concentrating structures shared by the pixels along a respective row or column.

In accordance with still another aspect, the light-concentrating structures are made from a first material having a first refractive index surrounded by a second material having a second refractive index lower than the first refractive index, and the light-concentrating structures rely primarily on total internal reflection to concentrate the light.

In yet another aspect, the light-concentrating structures are compound parabolic concentrators.

According to another aspect, the compound parabolic concentrators are truncated.

In accordance with still another aspect, the light-concentrating substrate representing a first light-concentrating substrate, and further including a second light-concentrating substrate including another array of light-concentrating structures each configured to concentrate light onto the light-modulating area of a corresponding one or more pixels within the array of pixels from a side of the array of pixels opposite the first light-concentrating substrate.

According to yet another aspect, the electro-wetting fluid includes a third fluid with optical properties different from the first and second fluids, and the at least one electrode in each pixel is configured to switch the display between transmissive and reflective operation.

In yet another aspect, the light-concentrating structures are made of material serving as a color filter for the display.

According to still another aspect, a display is provided that includes an array of pixels; and a light-concentrating substrate including an array of two-dimensional light-concentrating structures each configured to concentrate light onto light-modulating areas of corresponding pixels within the array of pixels.

In accordance with another aspect, the array of pixels is arranged in rows and columns, and the two-dimensional light concentrating structures have a cross-section that is invariant in one direction and thereby shared by pixels along a respective row or column.

According to another aspect, each pixel includes a hydrophobic layer; an electro-wetting fluid adjacent the hydrophobic layer, the electro-wetting fluid including at least first and second fluids immiscible with each other and having different polar properties and different optical properties; and a central pad electrode and two outer pad electrodes on opposite sides of the central pad electrode, wherein application of a voltage to the central and outer pad electrodes alters a wetting effect of the electro-wetting fluid on the hydrophobic layer in the light-modulating area of the pixel.

According to still another aspect, a display includes an array of pixels; and a light-concentrating substrate including an array of light-concentrating structures each configured to concentrate light onto the light-modulating area of a corresponding one or more pixels within the array of pixels. The light-concentrating structures are made from a first material having a first refractive index surrounded by a second material having a second refractive index lower than the first refractive index, and the light-concentrating structures rely primarily on total internal reflection to concentrate the light.

According to another aspect, the light-concentrating structures are compound parabolic concentrators.

In accordance with another aspect, the first refractive index is substantially equal to 1.5.

According to another aspect, a display includes an array of pixels; and a light-concentrating substrate including an array of truncated compound parabolic concentrators each configured to concentrate light onto light-modulating areas of corresponding pixels within the array of pixels.

In accordance with still another aspect, the truncated compound parabolic concentrators are made from a first material having a first refractive index surrounded by a second material having a second refractive index lower than the first refractive index, and the truncated compound parabolic concentrators rely primarily on total internal reflection to concentrate the light.

According to yet another aspect, a display is provided which includes an array of pixels; a first light-concentrating substrate arranged on one side of the array of pixels and including a first array of light-concentrating structures each configured to concentrate light onto the light-modulating area of a corresponding one or more pixels within the array of pixels; and a second light-concentrating substrate arranged an opposite side of the array of pixels and including a second array of light-concentrating structures each configured to concentrate light onto the light-modulating area of a corresponding one or more pixels within the array of pixels.

In accordance with still another aspect, the display includes a backlight; the second light-concentrating substrate is configured to concentrate light from the backlight onto the light-modulating areas of the pixels within the array of pixels; and the first light-concentrating substrate is configured to collimate light from the backlight transmitted through the light-modulating areas of the pixels toward a viewer.

According to still another aspect, the display is configured to be switched between transmissive and reflective operation.

To the accomplishment of the foregoing and related ends, the invention, then, includes the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features.

show the electrode layout, the fluid positions and the display appearance, respectively, in the dark state of the display, (d)-(f) show the electrode layout, the fluid positions and the display appearance, respectively, in the bright state of the display.

Figure 11:
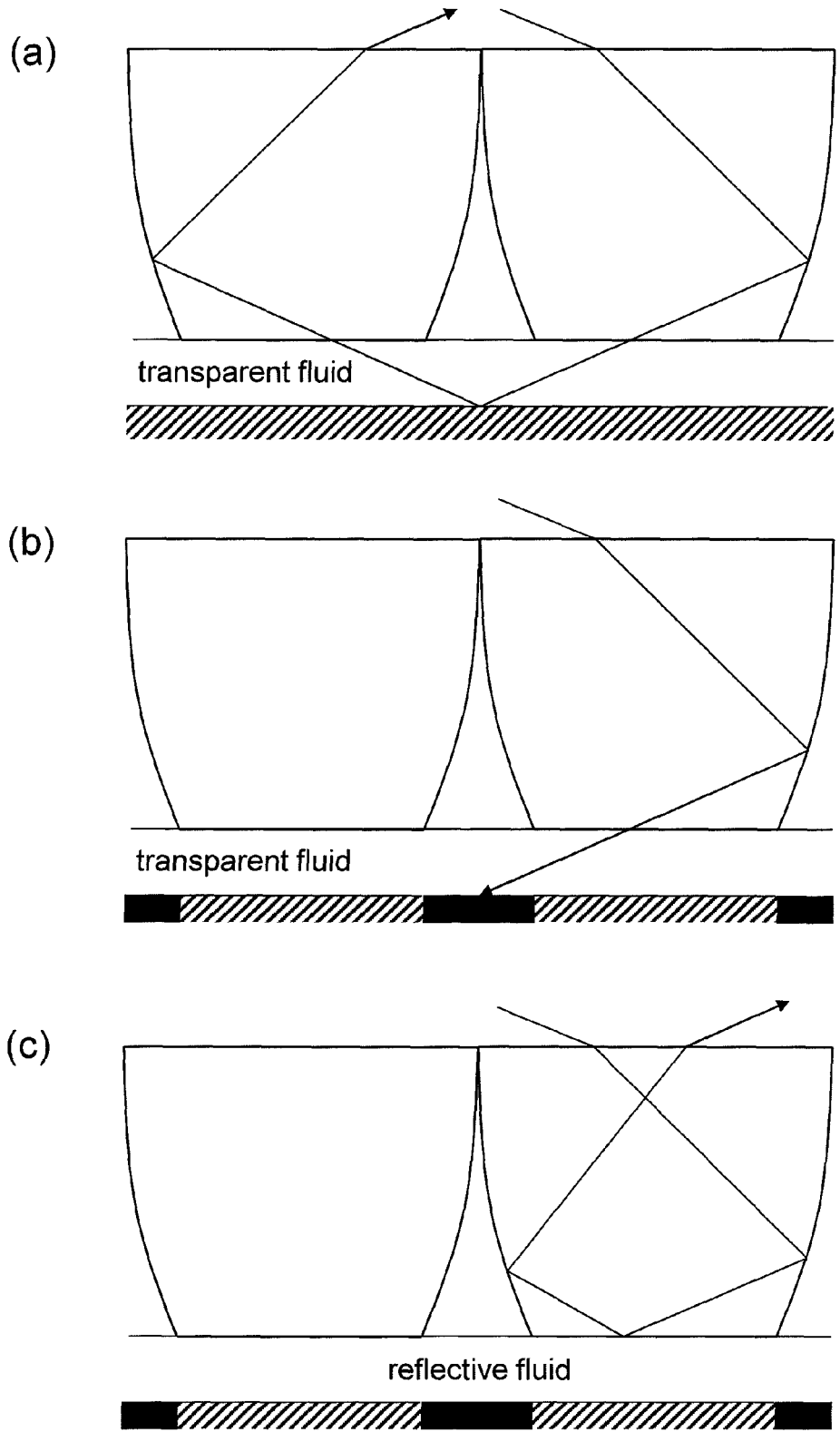

FIG. 11: Illustration of the effect of a vertical separation between bases of the light-concentrating structures and the pixel plane, (a) shows an example of a ray coming in through one light-concentrating structure, being reflected by the pixels and then emerging from the neighbouring light-concentrating structure, creating cross-talk between neighbouring pixels, (b) shows that this effect can be reduced by patterning the rear reflector behind the pixels and (c) shows how this problem is solved by using a fluid which is itself reflective.

Figure 12:
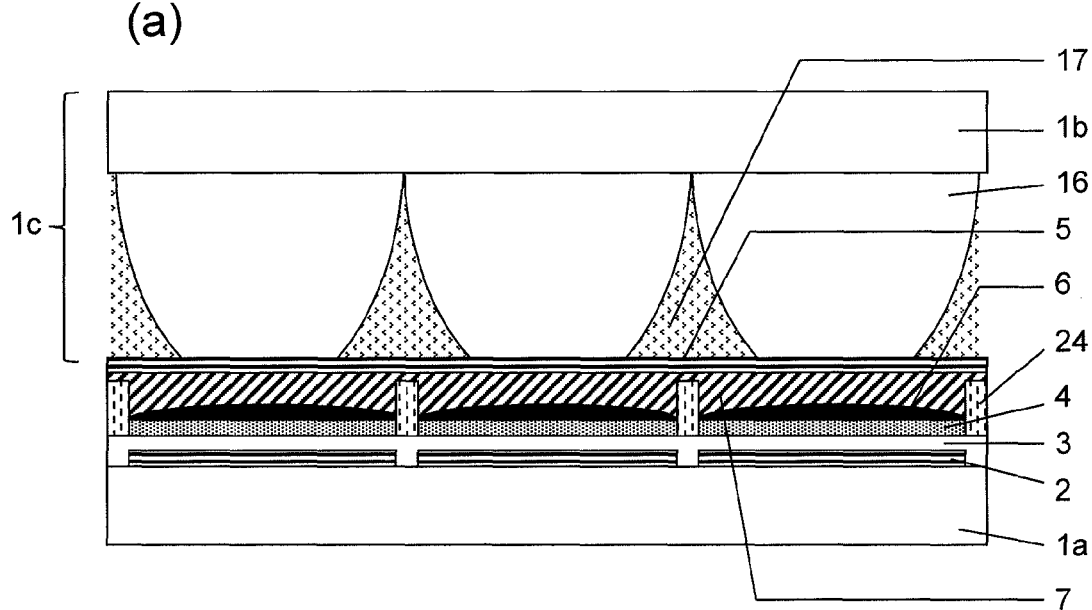
Figure 12:
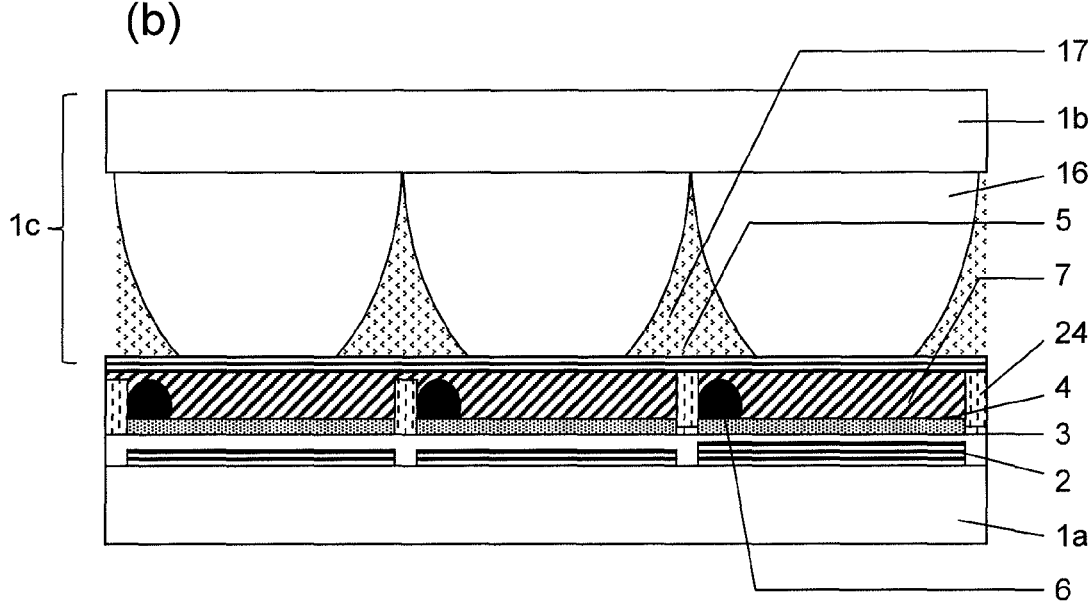

FIG. 12: A further embodiment of the invention which uses an alternative electrowetting mode, in which the fluid which is not positioned underneath the light-concentrating structures is pushed aside so that it is between the light concentrating structures, (a) shows the dark state and (b) shows the bright state.

Figure 13:
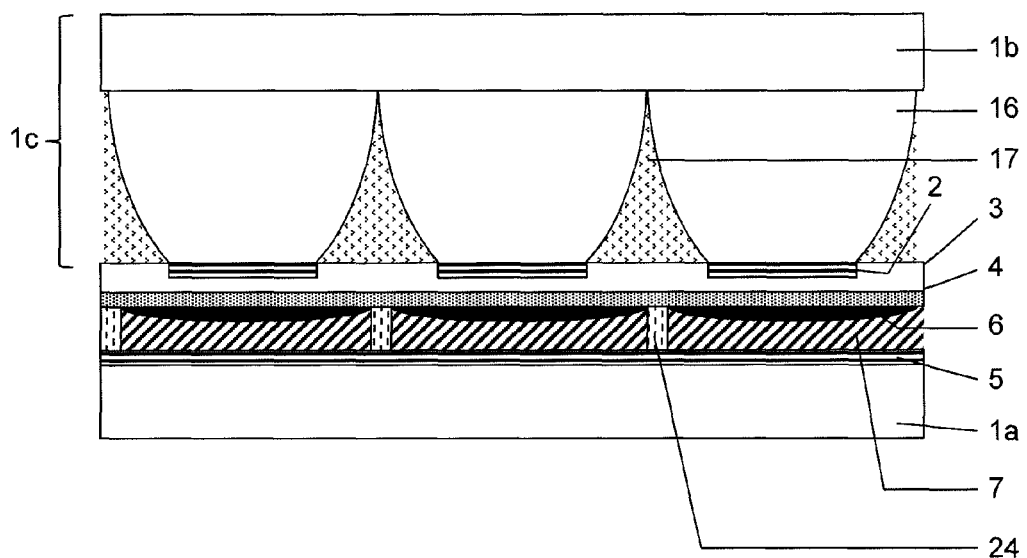
Figure 13:
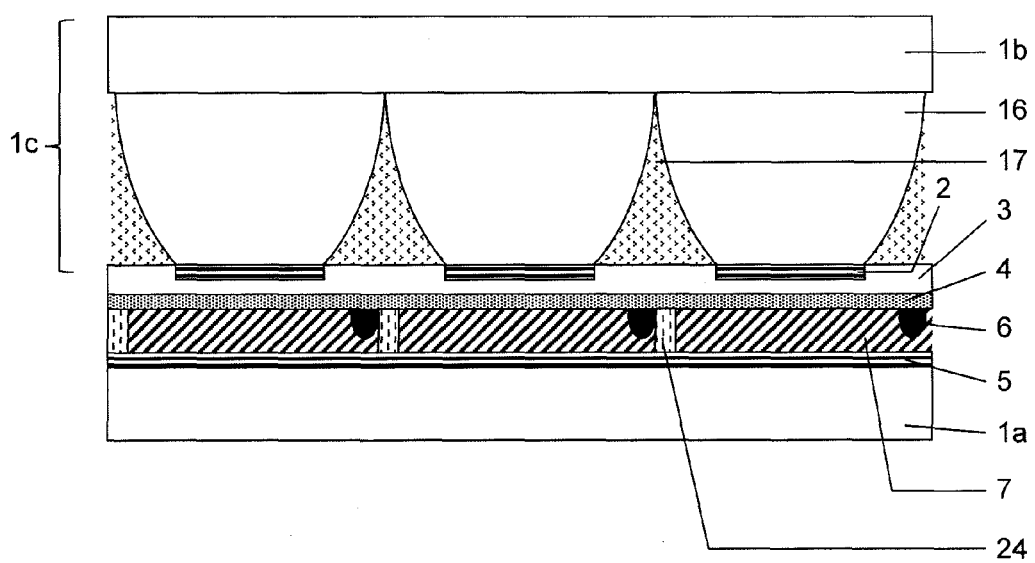

FIG. 13: A further embodiment of the invention which uses the same electrowetting mode as that illustrated in FIG. 12, but in a different configuration, (a) shows the dark state and (b) shows the bright state.

Figure 14:
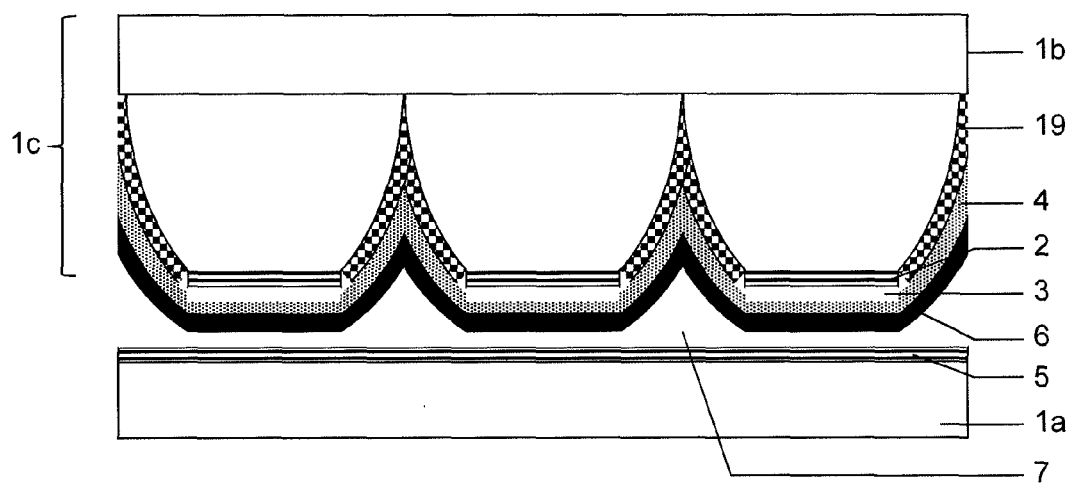
Figure 14:
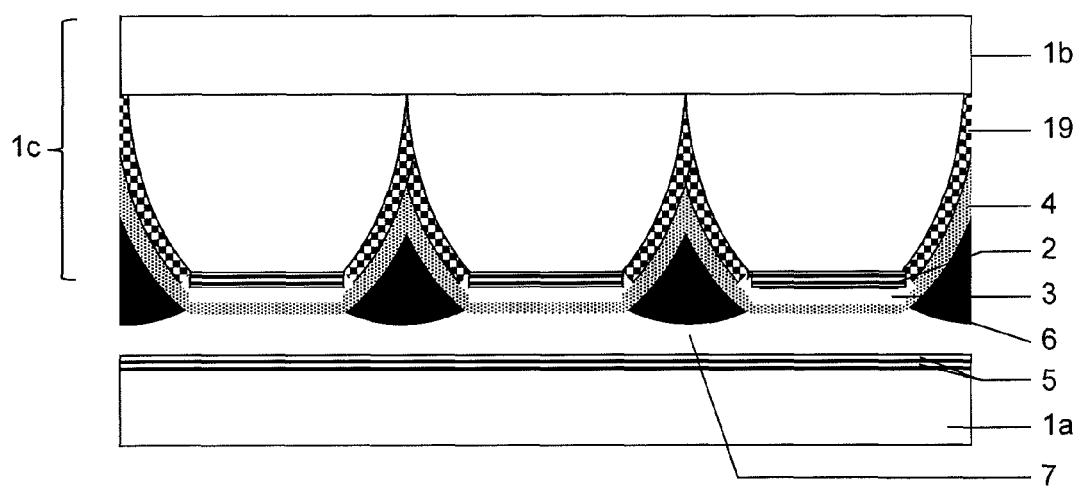

FIG. 14: A further embodiment of the invention in which the recesses between the light-concentrating structures are used to store electrowetting fluids when they are not positioned underneath the bases of the light-concentrating structures, (a) shows the dark state and (b) shows the bright state.

Figure 15:
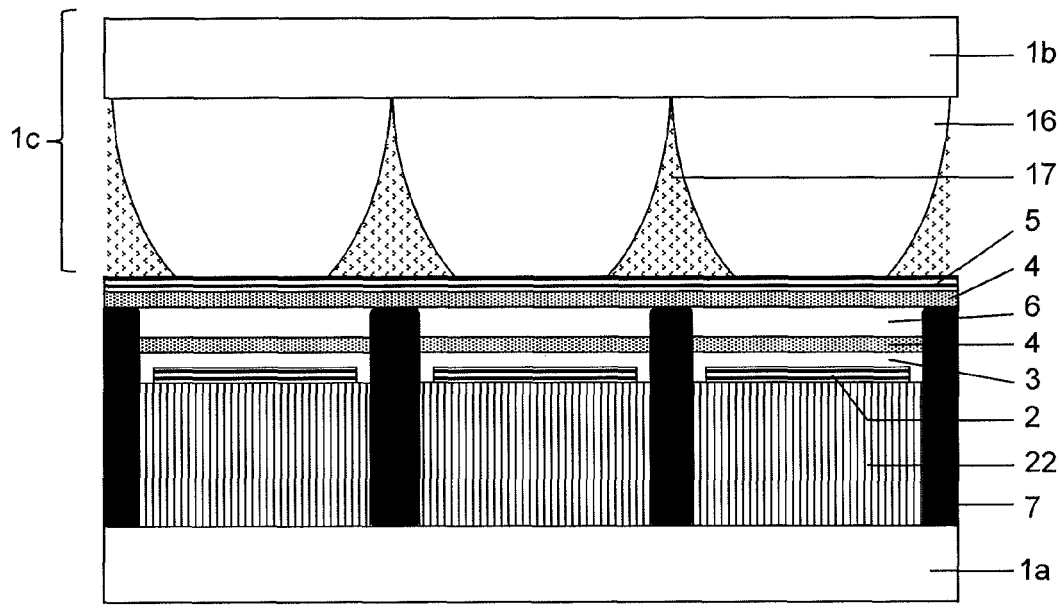
Figure 15:
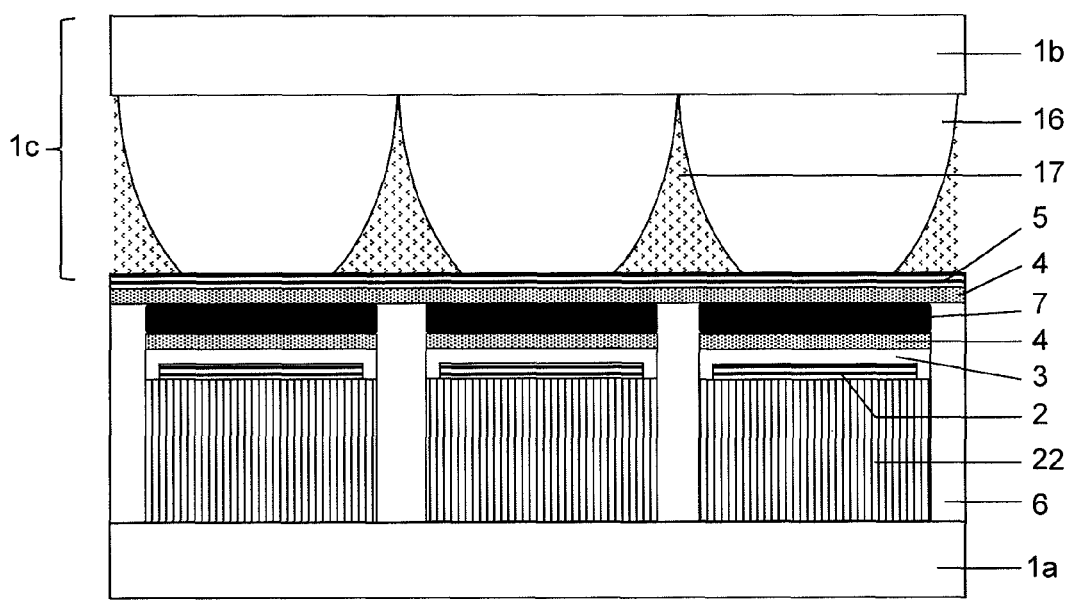

FIG. 15: A further embodiment of the invention in which an alternative electrowetting mode is used, in which the fluid which is not positioned underneath the bases of the light-concentrating structures is stored in a vertical reservoir, (a) shows the bright state and (b) shows the dark state.

Figure 16:
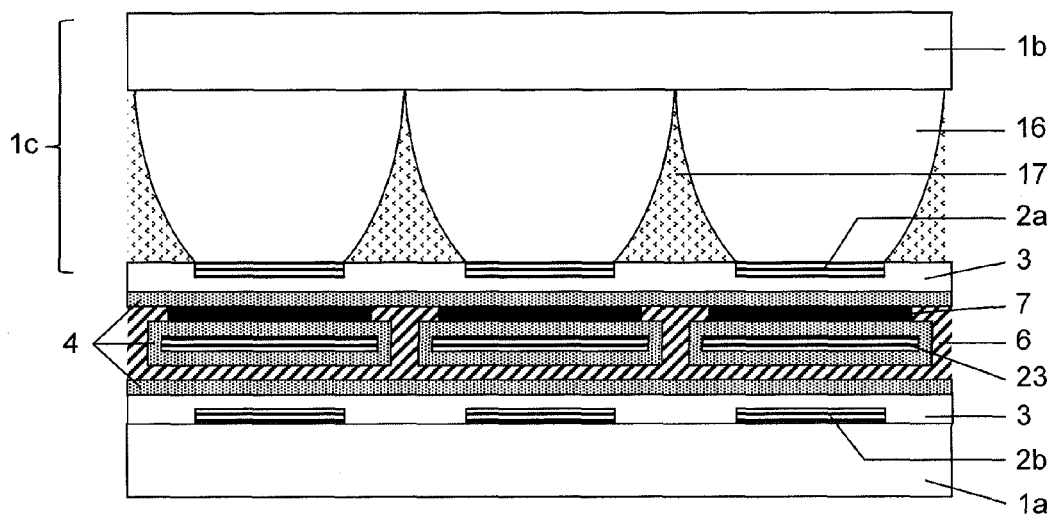
Figure 16:
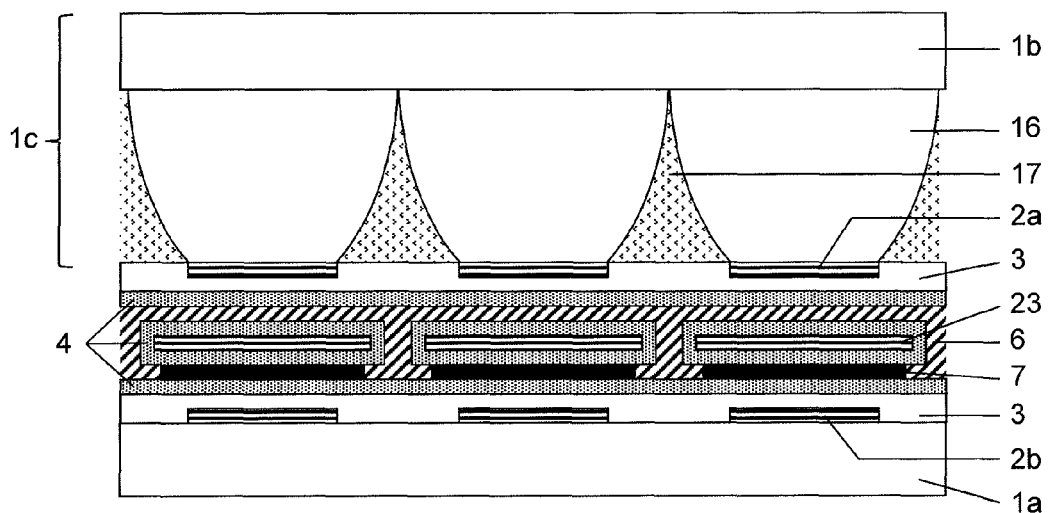

FIG. 16: A further embodiment of the invention in which an alternative electrowetting mode is used, in which the fluid which is not positioned underneath the bases of the light-concentrating structures is stored in a horizontal reservoir, (a) shows the dark state and (b) shows the bright state.

Figure 17:
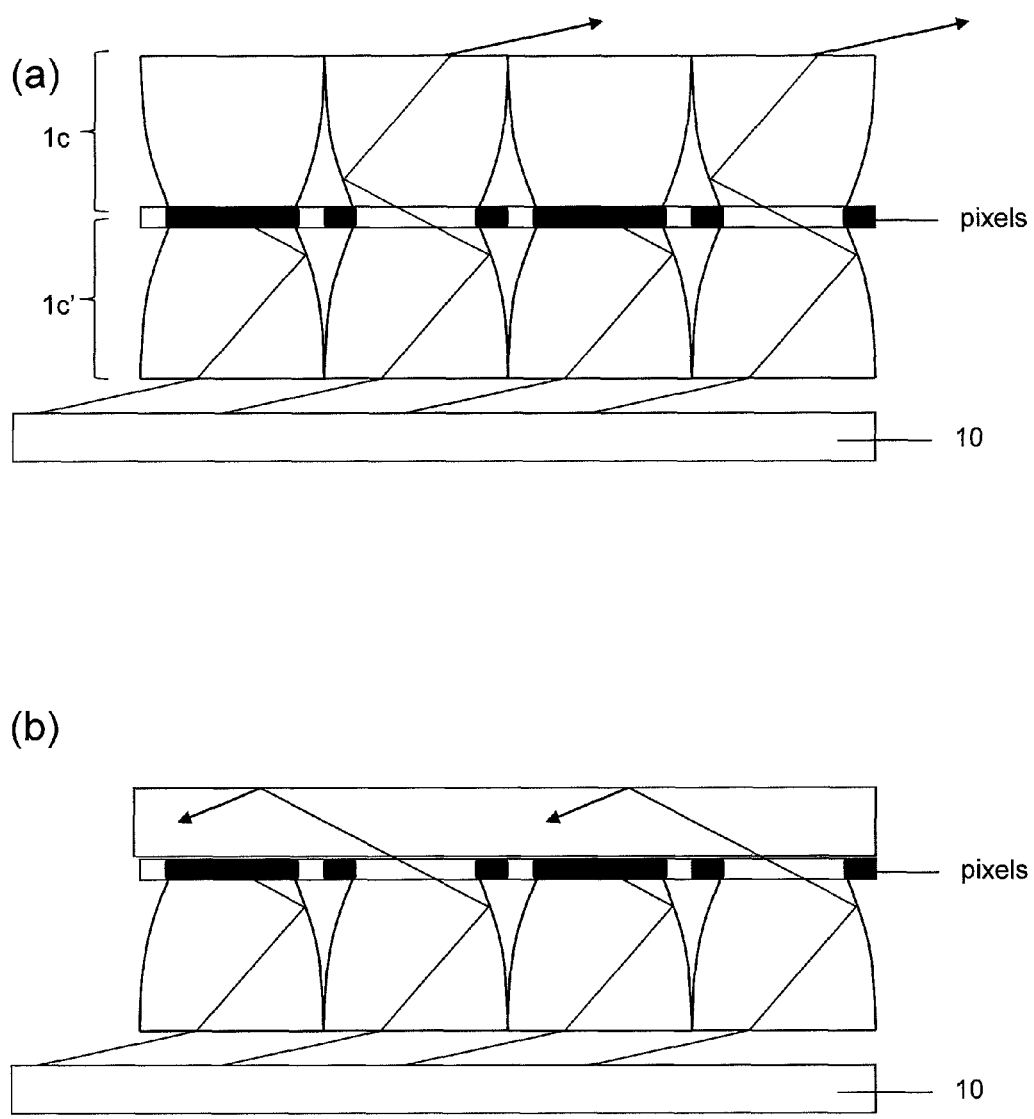

FIG. 17: Illustration of the necessity of using a light-concentrating structure array on the top substrate in a transmissive or transflective display, (a) shows the inclusion of a light-concentrating structure array on the top surface and (b) shows the absence thereof.

Figure 18:
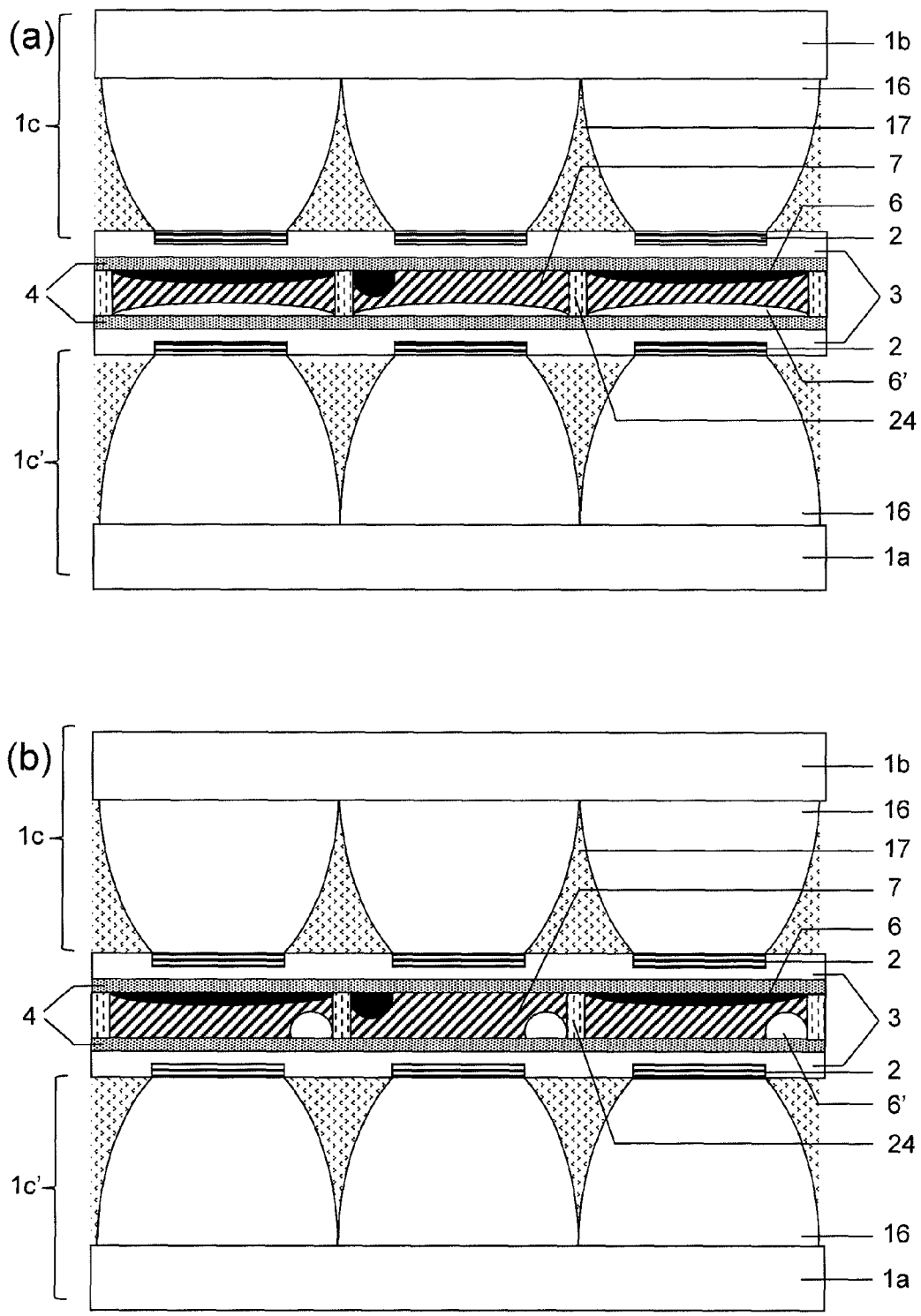

FIG. 18: Illustration of a switchable transflective embodiment of the invention, (a) shows the reflective mode, and (b) shows the transmissive mode.

Figure 19:
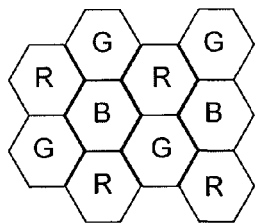
Figure 19:
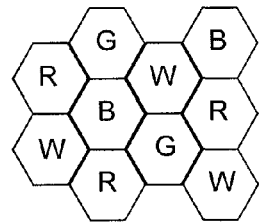

FIG. 19: Examples of colour filter layouts that can be used in conjunction with the embodiments of the current invention in order to create a colour display, (a)-(d) showing hexagonal, square, two-dimensional and two-dimensional alternative examples, respectively.

Figure 20:
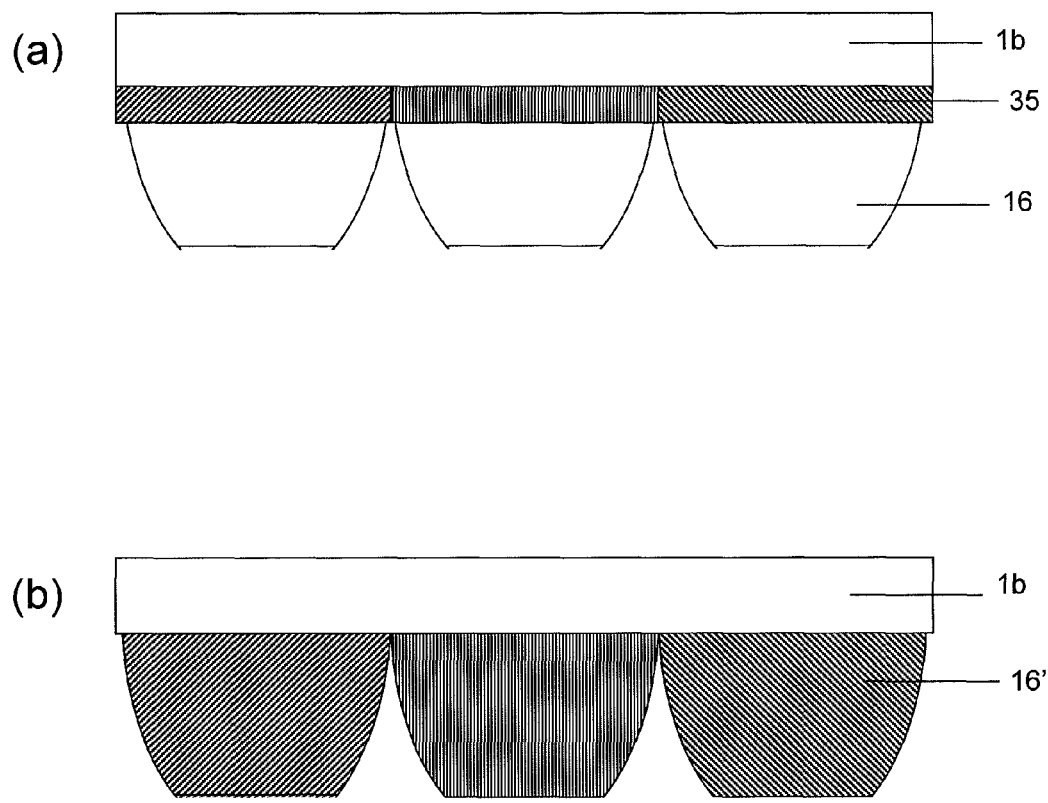

FIG. 20: Examples of two ways in which colour filters can be integrated into the embodiments of the current invention, in order to avoid parallax, (a) by positioning the colour filters directly underneath the light-concentrating structure, (b) by fabricating the light-concentrating structures from colour filter material.

Figure 21:
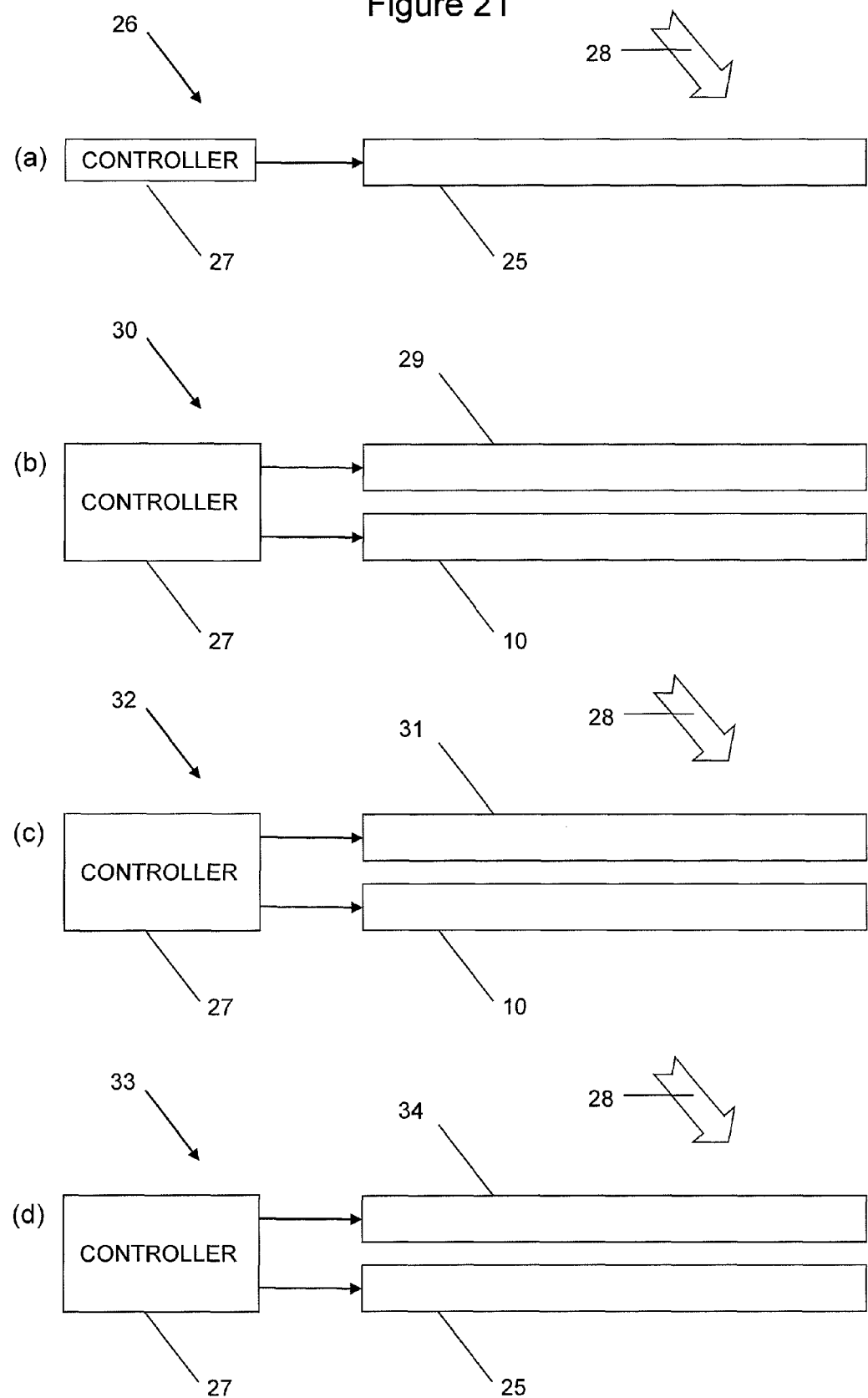

FIG. 21: system diagrams showing how the display, optional back-light and optional front-light are connected to the display controller in the following types of display: (a) reflective, (b) back-lit transmissive, (c) back-lit transflective and (d) front-lit transflective.

DESCRIPTION OF REFERENCE NUMERALS

1 substrate
1*a* lower substrate
1*b* upper substrate
1*c* light-concentrating substrate
2 electrodes
3 dielectric insulating layer
4 hydrophobic layer
5 uniform transparent electrode
6 non-polar fluid
7 polar fluid
8 black mask
9 viewer
10 backlight
11 base
12 top
13 a first side
14 a second side
15 light-concentrating structure manufactured directly into substrate
16 light-concentrating structure manufactured in a separate layer on-top of substrate
17 low index material
18 planarisation material
19 reflective metal material
20 dielectric mirror
21 pixel
22 mesa structure
23 separator electrode
24 pixel wall
25 reflective display
26 reflective display system
27 controller
28 ambient light
29 transmissive display
30 transmissive display system
31 transflective display
32 transflective display system
33 front-lit reflective display system
34 front-light
35 colour filters

DETAILED DESCRIPTION OF INVENTION

The present invention will now be described with reference to the drawings, in which like reference labels are used to refer to like elements throughout.

Before the preferred embodiment of this invention is described, it is desirable to define in detail a primary component of this invention, which is a light-concentrating substrate. The light-concentrating substrate includes of an array of light-concentrating structures which are formed on-top of an existing substrate, or an array of light-concentrating structures which are formed within a substrate, and planarised in some manner, to be described. The light-concentrating structures each have at least one light-concentrating cross-section, which in the ideal case is the cross-section of one of the set of compound parabolic concentrator cross-sections which will be described below, but is not limited to this case.

Figure 3:
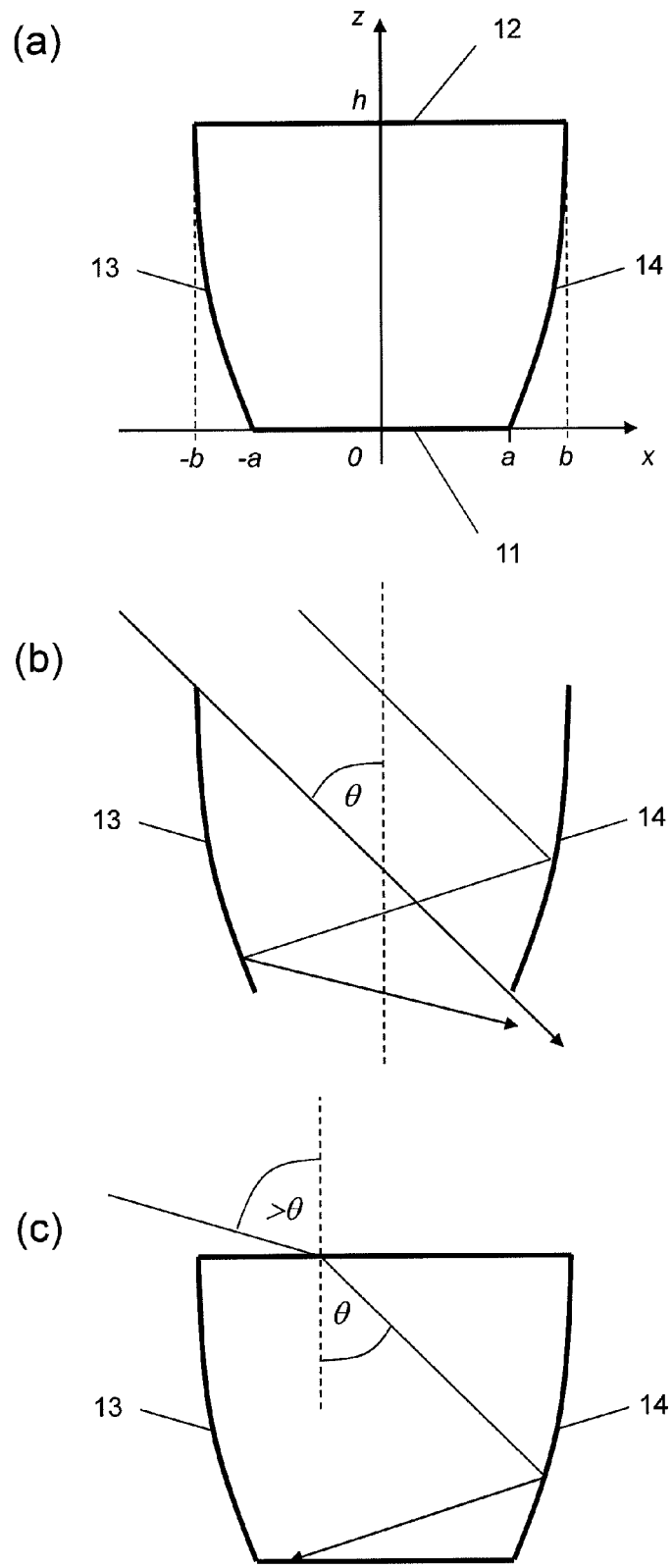
FIG. 3: Shows (a) the general ideal light-concentrating cross-section, (b) a circular light-concentrating structure, and (c) a hexagonal light-concentrating structure.

A compound parabolic concentrator (light-concentrating) cross-section is illustrated in FIG. 3(*a*). The cross-section has a flat base 11 of width $2a$ and a flat top 12 of width $2b$ which is parallel to the flat base 11. The curved lines 13 and 14 defining first and second sides, respectively, join the straight lines 11 and 12 can be any of the following family of equations:

$$(x\cos\theta + z\sin\theta)^2 + 2a(1+\sin\theta)^2 x - 2a\cos\theta(2+\sin\theta)x - a^2(1+\sin\theta)(3+\sin\theta) = 0, \quad \text{(equation 1)}$$

where x is the x-coordinate of the curve, and z is the z-coordinate of the curve, the origin is in the mid-point of the flat base 11, the x-axis runs parallel to the base and the z-axis runs perpendicular to the base and towards the flat top refers to positive values of z (as illustrated in FIG. 3(a)). The mid-point of the flat top 12 lies on the z-axis. θ is the parameter which characterises different curves within the set of different possible light-concentrating cross-sections, and physically refers to the maximum theoretical acceptance angle in the case that a hollow structure with cylindrical symmetry is created using the parabolic surfaces as reflective surfaces, as illustrated in FIG. 3(b). Of course if the same light-concentrating cross-section was used to make a non-hollow structure made from a medium of higher index than that from which the light rays are incident, then this would actually have a higher acceptance angle, because of the refraction of the rays as they enter the light-concentrating structure, as shown in FIG. 3(c). Given the parameter θ, and the half-base width a, then the half-top width b and the height h are given by:

$$b = \frac{a}{\sin\theta} \text{ and } h = (a + b)\cot\theta. \quad \text{(equations 2)}$$

Figure 4:
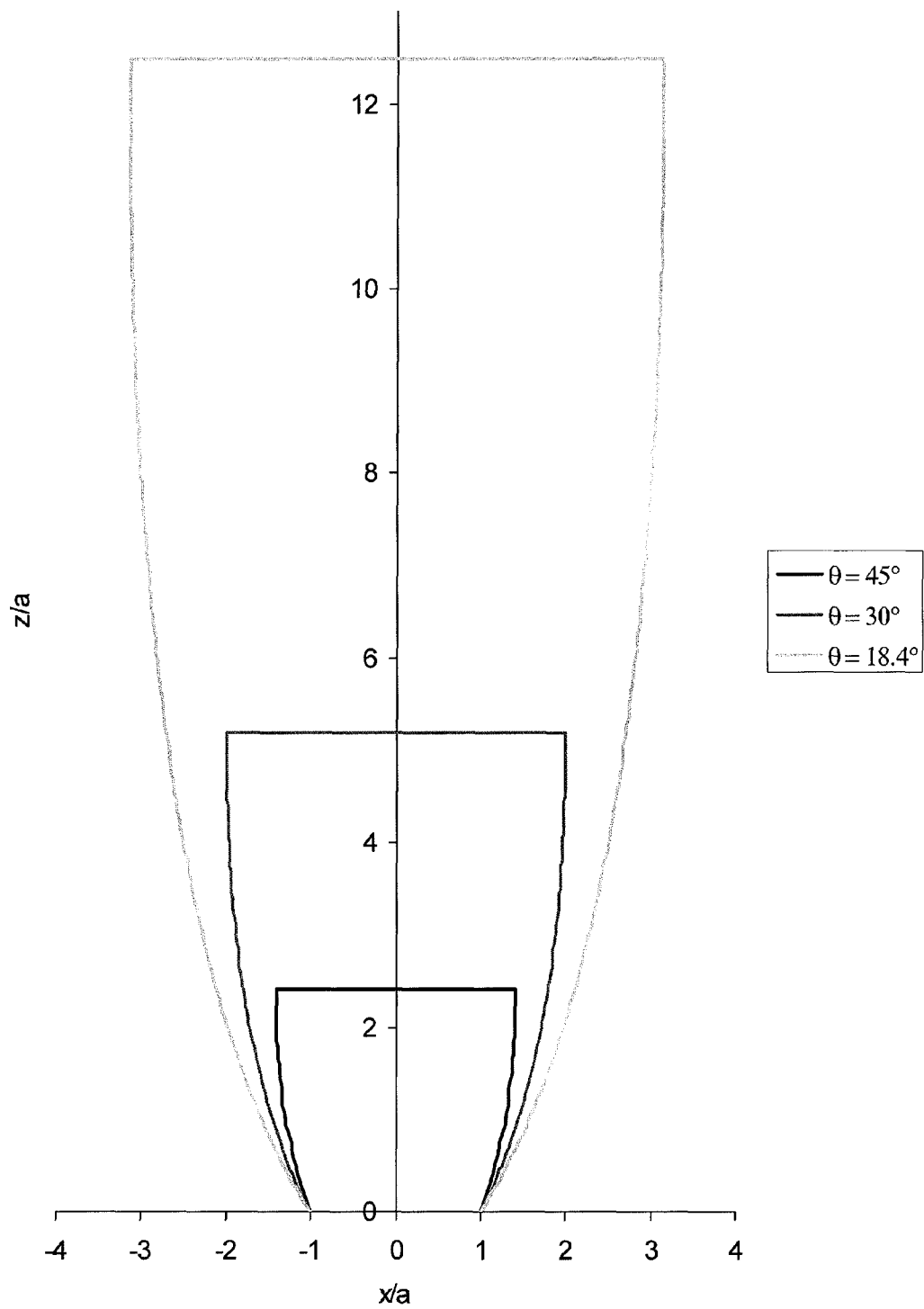
FIG. 4: Is a graph of three ideal light-concentrating cross-sections, for three different values of the parameter $\theta$.

It is clear that there are an infinite number of possible cross-sections, characterized by the parameter θ, and some examples are illustrated in FIG. 4 for three values of θ, and a fixed value of a. The higher the value of θ, the smaller the width 2b of the top of the light-concentrating cross-section, and the lower the height h of the top of the light-concentrating cross-section above the base. In practice what this means is that if one wishes to gather light over a large range of incident angles, they can only be focused onto a limited area, which is consistent with the principles of etendue. Light-concentrating structures are often used to concentrate sunlight onto a solar-cell, in order to reduce the area of solar cell used. However, it must always be borne in mind that if the area concentration ratio is very high, then the acceptance angle is correspondingly low. To some extent, the trade-off can be improved by using a light-concentrating structure with a higher refractive index than the incident medium, which will improve the acceptance angle for a given light-concentrating structure, as mentioned above. However, even then there are limits, because there will be losses through Fresnel reflections at the refractive boundary between the incident and light-concentrating structure materials. Luckily, in the case of displays, although a very high acceptance angle is desirable in order to make use of all of the available ambient light, the area concentration ratio required is not very high; at most a factor of 2.5 to allow for aperture ratios down to about 40%. With a light-concentrating structure constructed from material of refractive index around 1.5, this allows for light to be gathered from the entire hemisphere of incident light, and concentrated into an area which is just 43% of the incident area. In practice, the exact choice of light-concentrating structure will be a trade-off between getting a large acceptance angle and the area concentration ratio required.

Another aspect of light-concentrating cross-sections that is evident from FIG. 4 is that at the top of the structure, the tangent to the curved surface is normal to the top surface, i.e. the surface is infinitely steep. This presents a significant manufacturing challenge, especially when one takes into account the fact that the structures will be arrayed with as little gap as possible between each other, and on a length scale of the order of 100-500 microns, depending on the size of the display pixels. The difficulty of manufacture is significantly reduced if the light-concentrating structure is truncated, so that the bottom part of the structure is unchanged, and exactly as shown in FIGS. 3 and 4, but the top part is absent, so that at the top of the "truncated" structure, the tangent to the curved surface meets the new top surface at angle less than 90°. This is illustrated in FIG. 5(a), which shows an example of a full light-concentrating cross-section, and a second light-concentrating cross-section (which corresponds to a different, smaller, value of θ) which has been truncated so that the curved surface meets the top surface at an angle of around 70°, such that the vertices between adjacent light-concentrating structures is around 40°.

So far, light-concentrating cross-sections have been described which are ideal light-concentrating cross-sections. However, the present invention includes all possible light-concentrating cross-sections, including truncated light-concentrating cross-sections, other types of parabolic-sided cross-sections, other types of curved-sided cross-sections, and straight-sided cross-sections.

So far, the nature of a light-concentrating cross-section has been described without explaining in detail how this relates to the three-dimensional shape of a light-concentrating structure. The ideal light-concentrating structure, illustrated in FIG. 5(b), has an infinite number of identical light-concentrating cross-sections, i.e. the base and top are circular, and all the cross-sections taken normal to the z-axis are circular. This type of structure has the most ideal optical properties and will have the best performance, however, it is not suitable when applied to displays because an array of circular structures cannot tessellate with each other. One alternative is illustrated in FIG. 5(c): the structure has hexagonal cross-sections taken normal to the z-axis, and when sliced along the dotted lines in FIG. 5(c) has a light-concentrating cross-section such as that of a light-concentrating structure as in FIG. 3(a). Because the structure is hexagonal rather than cylindrical, not all of the cross-sections will be the same, and therefore even if it has some ideal light-concentrating cross-sections, not all of the cross-sections will be light-concentrating cross-sections, and hence the optical performance is not ideal. However, they can tessellate and fill up all of the area of the display, and hence overall are preferable to circular light-concentrating structures for this application. A further alternative is a square equivalent, as shown in FIG. 5(d): the cross-sections taken normal to the z-axis are square, and the cross-sections through the diagonals are light-concentrating cross-sections such as those of a light-concentrating structure as in FIG. 3(a). Yet further alternatives are rectangular and two-dimensional light-concentrating structures, the latter of which is illustrated in FIG. 5(e). In the case of the two-dimensional light-concentrating structure, the structure is invariant in one direction, and the cross-section taken perpendicular to that axis is a light-concentrating cross-section such as that of a light-concentrating structure as in FIG. 3(a). For example, in the case of a two-dimensional light-concentrating structure as shown in FIG. 5(e), the structure may be invariant in one direction, and thereby shared by the pixels along respective rows (or columns). Using two-dimensional light-concentrating structures (FIG. 5(e)), rather than three-dimensional (FIG. 5(b)-(d)) has a number of particular advantages which will be described here. Firstly, the use of light-concentrating structures which are completely invariant in one direction has the advantage that the structures are far simpler and easier to fabricate. A second advantage is in the viewing angle characteristics of the final display (of which the array of light-concentrating structures is just one part). However, the viewing angle characteristics of the final display will be determined more by the characteristics of the light-concentrating structure array than they will by the underlying display mode used underneath the light-concentrating structure array. As might be expected, the resulting viewing angle of a display using a two-dimensional light-concentrating structure array is highly anisotropic, with the viewing angle much wider along the axes of the light-concentrating structures than perpendicular to them. The same display mode applied to a three-dimensional light-concentrating structure array would have the more limited of these two viewing angles along both of its axes, and hence the advantage of using a two-dimensional light-concentrating structure array is evident.

Figure 6:
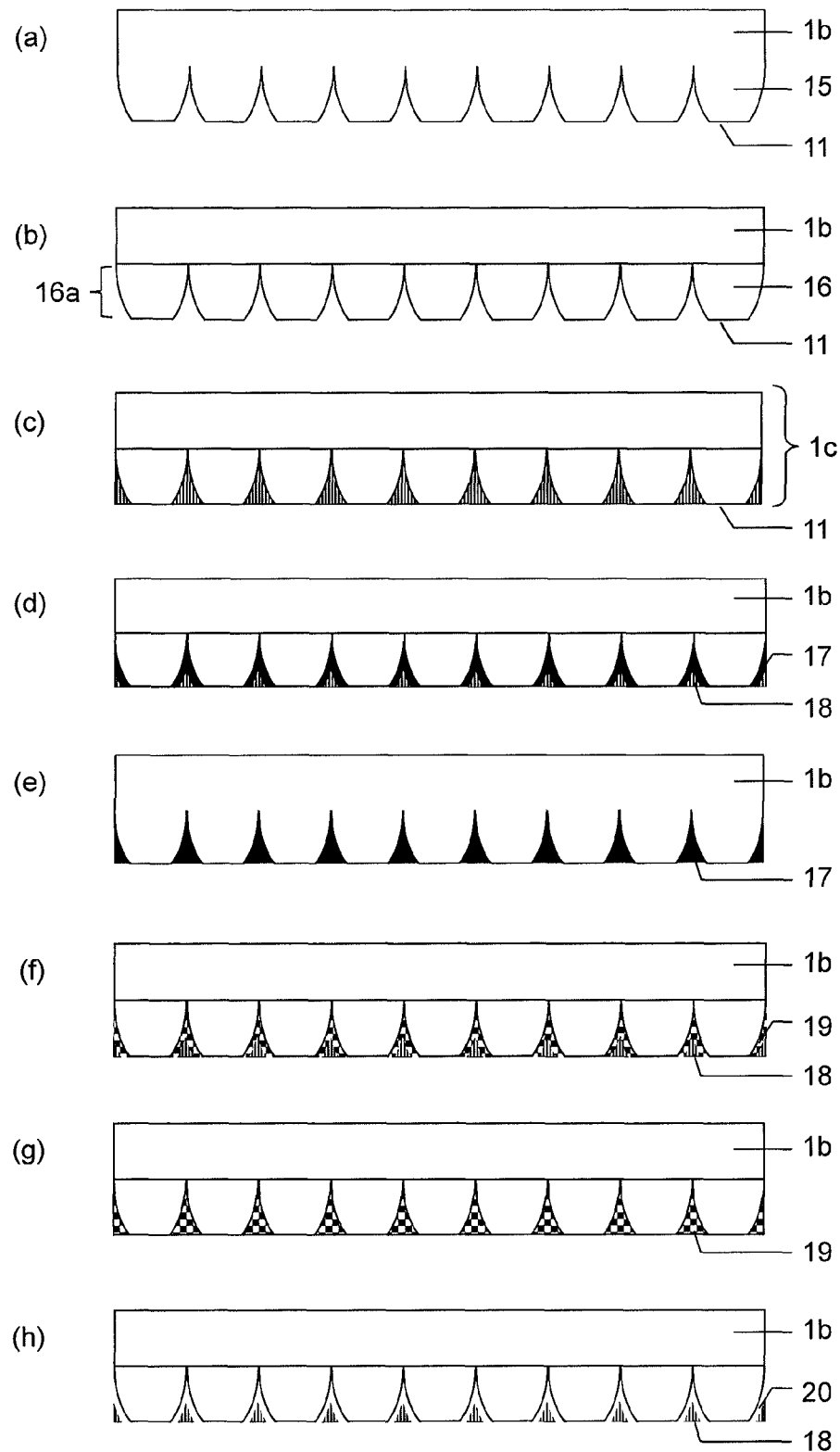
FIG. 6: Illustrates different ways in which a light-concentrating substrate can be constructed from different materials: (a) the light-concentrating structure is formed within the substrate; (b) the light-concentrating structure is formed within a layer of a different material that has been deposited onto the substrate; (c) shows how a light-concentrating substrate has one surface co-incident with the bases of the light-concentrating structures; (d) shows the side surfaces of the light-concentrating structures coated with a low index material and the resulting structure planarised with another material; (e) shows the light-concentrating structures planarised with a low index material; (f) shows the side surfaces of the light-concentrating structures coated with a reflective metal and the resulting structure planarised with another material; (g) shows the light-concentrating structures planarised with a reflective metal material; (h) shows the side surfaces of the light-concentrating structures coated with a dielectric mirror coating and the resulting structure planarised with another material.

Before describing the exemplary embodiment of this invention, we will first describe how the light-concentrating structures can be constructed and then planarised to form a light-concentrating substrate which can then be built into a display. The light-concentrating structures are formed onto or as part of a substrate, as illustrated in FIG. 6. The original, unstructured substrates (lower substrate 1a (not shown) and upper substrate 1(b)) will be made from a transparent material such as glass or plastic. Light-concentrating structures 15 could be formed in and from the same material as the upper substrate 1b, or a different material, depending on the method of fabrication, but will generally be made of a transparent material with a similar refractive index to the upper substrate 1b. The light-concentrating structures 15 could be formed from the material of the original substrate 1b by a process of patterned etching or cutting (FIG. 6(a)). Alternatively light-concentrating structures 16 could be formed separately in a second material 16a which is deposited on-top of the substrate 1b (FIG. 6(b)). For example, the light-concentrating structures 16 could be made by photolithography or by embossing (UV or thermal) into a resin or a resist 16a that has been deposited on-top of the substrate 1b. Once the light-concentrating structures 15 or 16 have been formed, in most (but not all) of the embodiments of this invention, the substrate must be planarised, and otherwise a new light-concentrating substrate 1c is formed, where one surface now coincides with the bases 11 of the light-concentrating structures, as illustrated in FIG. 6(c). The steps used in creating the planarised structure will depend on the optical design of the light-concentrating structures, and whether it relies on total-internal-reflection (TIR) for the reflections at the surfaces of the first and second sides 13 and 14.

The useful operation of the light-concentrating structures within the display relies on the reflection of light at the surfaces which correspond to first and second sides 13 and 14 in FIG. 3(a). Some reflection occurs at any boundary between any two media of differing refractive index, but in practice in order to create a strong reflection there are two main options available. One is to force reflection to occur at the sides of the structure by coating the sides of the structure with a reflective material, such as metal. The reflective material could be any metal, but in practice, aluminium and silver are often the preferred options as they tend to offer higher reflectivities, usually 92% and 96% respectively for high quality metal deposition. The metal layer needs to be sufficiently thick to be optically opaque; generally 50-100 nm is sufficient. Such a layer can be deposited by a number of techniques including evaporation, electro-plating, sputtering, printing, spinning, dipping or spraying. An alternative to a single metal layer is to deposit a multi-layer dielectric coating. Such coatings, which operate on the principle of thin-film interference, can be designed to have superior reflecting properties compared with metal, even over a range of wavelengths such as the visible part of the electromagnetic spectrum (400 nm-700 nm). However, they are much harder to make than a single layer metal coating, as the thickness of each individual layer has to be accurately controlled, and there can be many layers within the structure. Additionally, the design and deposition of such layers onto curved surfaces, as would be necessary in this case, would present an even greater manufacturing challenge. The second way in which a significant reflection can occur is via total-internal reflection. If light is incident on a refractive boundary from within the medium of higher index $n_1$, then total-internal reflection will occur when the angle that the light ray makes with the local surface normal $\alpha$ is greater than:

$$\sin^{-1}\left(\frac{n_2}{n_1}\right)$$

where $n_2$ is the lower refractive index of the medium beyond the boundary. Provided that the angle of incidence of the light is greater than this critical angle, this is the most efficient type of reflection as there is no energy carried into the transmitted beam. However, depending on the illumination conditions and the light-concentrating structure, it can be less efficient overall, because not all of the rays are at angles of incidence greater than the critical angle. Generally, in the case where the light-concentrating structures are CPC structures which are made from a first material having a first refractive index substantially equal to 1.5 and surrounded by a second material having a second refractive index lower than the first refractive index, the angles of incidence generally allow the light-concentrating structures to rely primarily on TIR to occur for the majority of the light rays incident on the curves surfaces to concentrate the light, and hence because of the very high reflectivity of these rays, a TIR reflection is the preferred one. However, in practice, whether a metal, dielectric or TIR interface is used will depend on the materials used to make the display and the manufacturing methods available.

If using TIR as the method of causing reflection at the curved light-concentrating surfaces, then it is apparent that the material immediately adjacent to the curved surface must be of a lower index than the material from which the light-concentrating structure is made. One way to do this is to coat the light-concentrating structure in a layer of low refractive index material 17 (at least 1 micron thick), then fill in the rest of the structure with a planarization material 18 of any refractive index, as shown in FIG. 6(d). Low refractive index materials (hereafter referred to as low index materials) typically consist of some kind of mixture of a polymer and air (e.g. small air pockets within a polymer matrix), where the length scale of the structure is much less than the wavelength of light, so that an average refractive index somewhere intermediate between that of the polymer (typically in the region of 1.5) and that of air (1). An alternative would be to fill in the structure immediately with the low index material 17, as shown in FIG. 6(e). In the case that a metallic layer is being used to force reflection at the curved surfaces of the light-concentrating structures, then there are two analogous situations to the previous two. FIG. 6(f) shows the situation where a metal layer 19 (in this case it only needs to be about 100 nm thick) is deposited and the structure is then planarised by another material 18. FIG. 6(g) shows the situation where the planarization is done with the metallic material 19. FIG. 6(h) shows the situation where a dielectric multi-layer stack 20 is deposited on-top of the light-concentrating structure, and the planarization has been continued with another material 18 not part of the dielectric stack design. In all of these cases, the structure is finished so that the bases 11 of the light-concentrating structure are revealed, and the surface of the new, planarised light-concentrating substrate 1c is coincident with the plane of the bases 11 of the light-concentrating structures, as illustrated in FIGS. 6(c)-(h). This finishing could simply be a uniform polishing of one side of the substrate so that any extra low index, metallic, dielectric or planarization material that has been deposited on-top of the bases 11 of the light-concentrating structures is removed. Alternatively, the bases 11 of the light-concentrating structures could be treated or masked in some way in order to ensure that these materials are not deposited on the bases 11 of the light-concentrating structures in the first place.

In the embodiments which follow, reference will be made the light-concentrating structures, which will be understood to mean any structure which can be used to concentrate light incident from a first area into a second smaller area, where the second area is smaller than the first area. In the ideal case, the light-concentrating structures are light-concentrating structures, with at least one cross-section described by equation 1 and parameterized by θ, any level of truncation to any apex angle, and any of the three-dimensional structures discussed above (e.g. hexagonal, square, rectangular) or two-dimensional structures. Note that in some cases the sides of the light-concentrating structures are substantially straight, and therefore may not appear to be light-concentrating structures, but nevertheless are considered light-concentrating structures herein in the broadest sense of the invention. However, the term light concentrating structure will be understood to include any structure which performs a similar function to a light-concentrating structure, for example those which have parabolic sides which are not of the set of light-concentrating structures, structures with otherwise curved sides, or straight sided structures. When reference is made to a light-concentrating substrate, this can include any of the above light-concentrating structures or combinations thereof, any type of reflective surface, and any method of planarization, as outlined above.

Figure 7A:
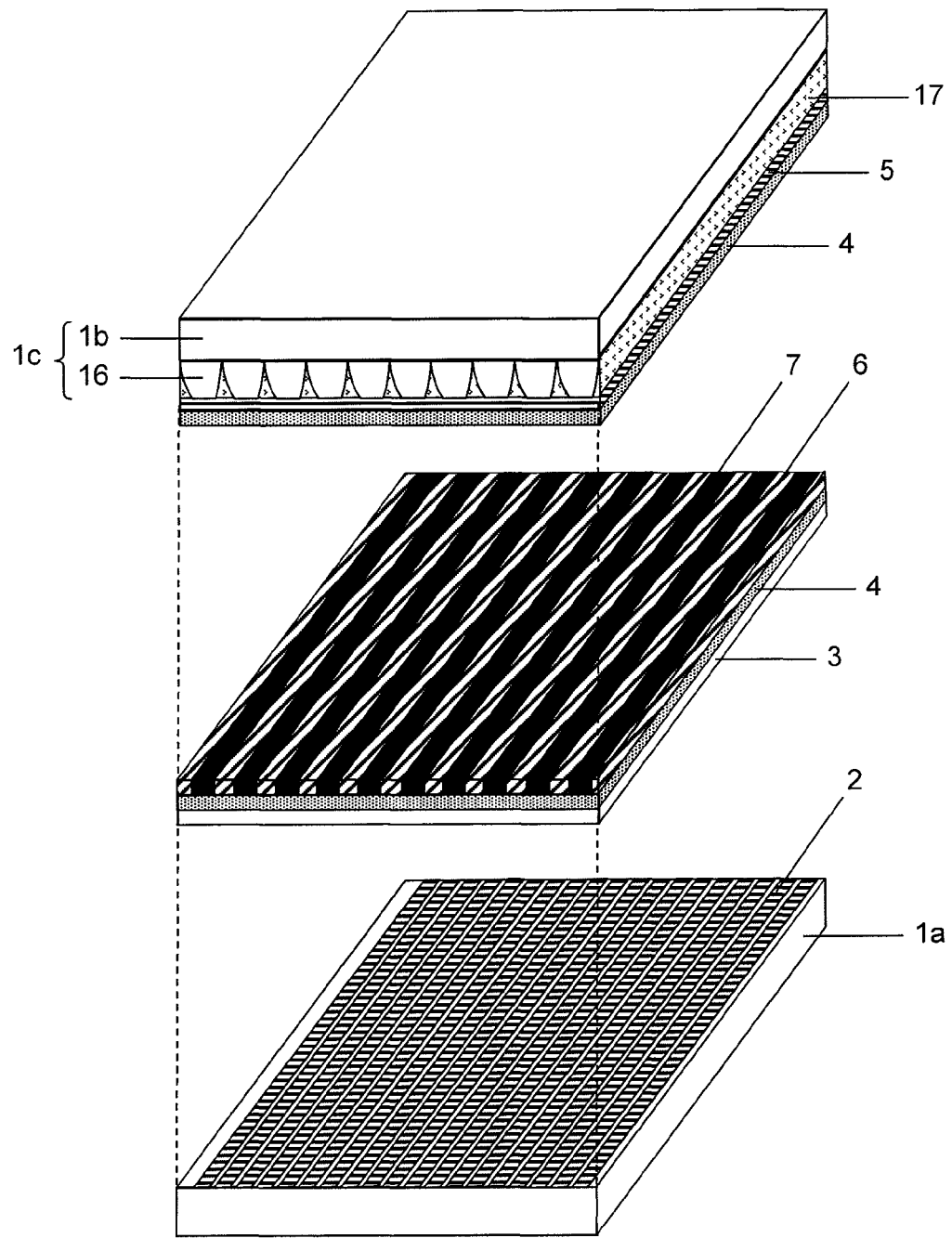
FIG. 7: Illustration of a preferred embodiment of the invention: (a) an exploded perspective-view of the structure of the embodiment, (b) a side-view of the dark state of the display, (c) a side-view of the bright state of the display.

FIGS. 7(a)-7(c) illustrate an exemplary embodiment of a display in accordance this invention, in which a light-concentrating substrate 1c has been created by forming light-concentrating structures 16 on-top of an existing substrate 1b, as described above. The light-concentrating substrate 1c includes an array of light-concentrating structures (e.g., 16) each configured to concentrate light onto the light-modulating area of a corresponding one or more pixels within the array of pixels. As will be appreciated, the base 11 of each light-concentrating structure (FIG. 3(a)) defines the light-modulating area of a corresponding pixel or pixels. The light-concentrating structures 16 shown in the figure are of the truncated type, and have been planarised with a low index material 17, but this embodiment is not limited to that particular case. There are, however, constraints on the area concentration ratio of the light-concentrating structures 16 in order for this to be a preferred embodiment: it should be greater than or equal to 2. This means that the ratio of the area of the light-concentrating bases to the area of the top of the light-concentrating structures 16 is less than ½. The finished light-concentrating substrate 1c has been coated uniformly with a transparent conductor 5 such as ITO, and a hydrophobic layer 4 such as Teflon or Cytop. A second substrate 1a has patterned electrodes 2 arranged in an array of rows and columns to form selectively addressable pixels as will be appreciated herein. The patterned electrodes 2 could be made of any conductive material, e.g. metal or ITO.

Generally speaking, the display in accordance with the present invention is made up of an array of pixels which each include at least one hydrophobic layer and an electro-wetting fluid adjacent the hydrophobic layer. The electro-wetting fluid includes at least first and second fluids immiscible with each other and having different polar properties and different optical properties as described herein. The pixels each include a least one electrode wherein application of a voltage to the electrode alters a wetting effect of the electro-wetting fluid on the hydrophobic layer in a light modulating area of the pixel.

On-top of the electrodes 2 is a dielectric insulating layer 3 which could be made of any dielectric material, but is preferably non-porous, and has a high dielectric constant and break-down strength, for example, SiN, $Al_2O_3$ or $HfO_2$. On-top of the dielectric insulating layer 3 is a further hydrophobic layer 4 such as Teflon or Cytop. In between the two substrates 1a and 1b are sandwiched two types of electrowetting fluid which are immiscible with each other. One of the fluids 6 represents a first fluid and is a transparent non-polar fluid, such as an oil, e.g. dodecane. The other fluid 7 represents a second fluid and is a polar fluid such as water, or a mixture of water and ethanol, in which a black dye has been dissolved, or pigments or nanoparticles suspended in order that visible light striking this fluid is absorbed. In this embodiment, the display is reflective, and the non-polar fluid 6 is transparent. Therefore, there must be a reflector (not shown) positioned somewhere underneath the electrowetting fluids. This could form part or all of the hydrophobic layer 4, or the dielectric insulating layer 3, or the electrodes 2. Alternatively, all three of these layers could be transparent, and an extra reflector layer placed underneath the electrodes 2 (again not shown in FIG. 7). The reflective layer could be a specular or a diffuse reflector, and may or may or not be accompanied by a transmissive diffusive layer to diffuse any specular reflections. A specular reflector is easily made by depositing a shiny metal layer by evaporation: this could also form the electrode. A metal electrode could also be made more diffusely reflecting by structuring the metal to include a series of micro-bumps.

Figure 7:
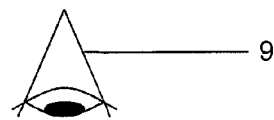
Figure 7:
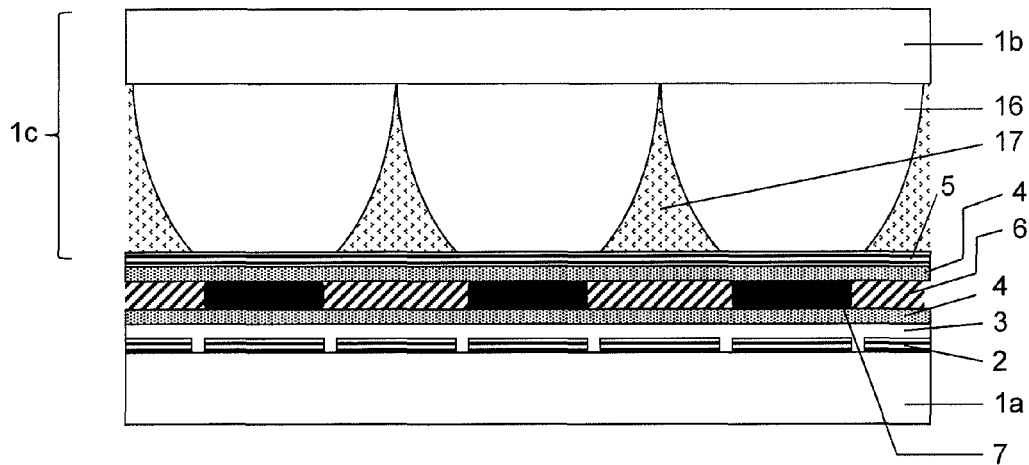
Figure 7:
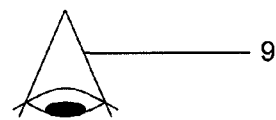
Figure 7:
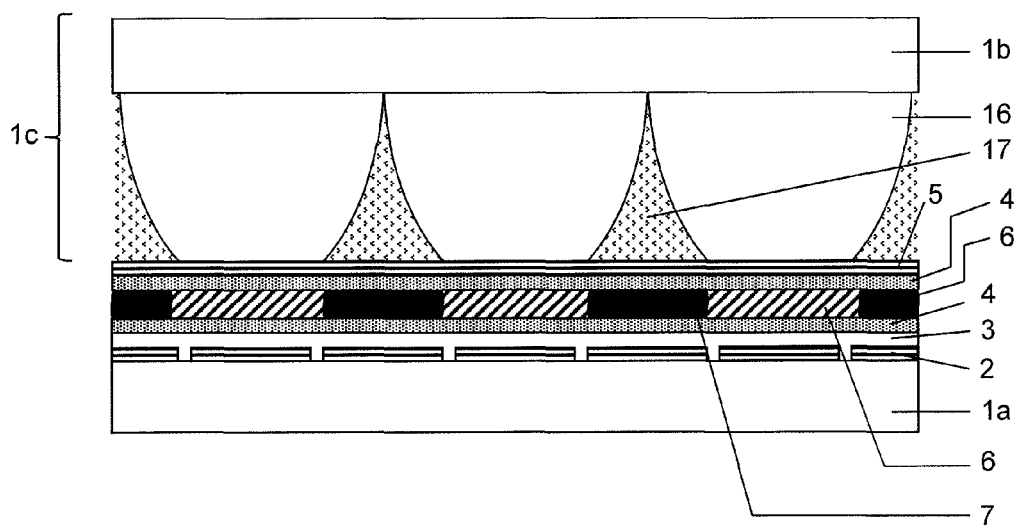

A specular reflector can also be made by creating a thin-film stack of dielectric layers of well controlled thicknesses. Such a stack can be engineered to have superior reflecting characteristics when compared with a metallic reflector. A dielectric stack can also form part or all of the dielectric insulating layer 3. A diffuse reflector can be made by depositing a random array of micro-spheres of a dielectric material such as $TiO_2$. The spheres could be deposited within a carrier solvent by a method such as printing. Also underneath the electrodes 2 (and optional reflective layer) could be thin-film-transistors (TFTs) which are used to control the voltages applied to the electrodes 2 (also not shown in FIG. 7). Alternatively, the electrodes 2 could be controlled using a passive matrix as is common in some LCDs, particularly low information content or bistable ones. The relative volumes of the two fluids 6 and 7 are related to the area ratio of the light-concentrating structures 16. If the ratio of the area of the bases of the light-concentrating structures 16 to the tops is β, then the fraction of the total volume of fluid which is taken up by the polar fluid 7 is greater than or equal to β. What this means is that it is possible to dispense the black polar fluid 7 in droplets that are the correct size to fill, or slightly over-fill all of the bases of the light-concentrating structures 16, as shown in FIG. 7(b). Because β<½, the same volume of black fluid can also occupy the spaces between the bases of the light-concentrating structures 16 (as shown in FIG. 7(c)), without overlapping onto the bases. The action of the curved surfaces of the light-concentrating structures 16 is to direct all or most of the ambient light through the base of the light-concentrating structure and onto whichever of the two fluids 6 and 7 are present at the base of the structures. In the case of FIG. 7(b), the black, polar fluid 7 is at the base of the structures, and hence all, or nearly all, of the incident light rays are absorbed by that fluid, and the display appears dark. The reflective parts of the display are not seen by the observer 9. In the case of FIG. 7(*c*), the black, polar fluid 7 is positioned away from or in a space between the bases of the light-concentrating structures 16, and hence all, or nearly all, of the incident light rays pass through the transparent non-polar liquid 6 and are reflected by the rear reflector which is positioned somewhere beneath the transparent non-polar fluid 6. The reflected rays are redirected back out through the light-concentrating structures 16 and the top substrate 1*b* and to the viewer, so that the display appears white. The position of the droplets of polar fluid 7, and therefore the appearance of each individual pixel is controlled by the voltages applied to the electrodes 2 (in the manner of simple lateral droplet motion illustrated in FIG. 1), and hence a display image can be generated. There may be pixel walls (not shown in FIG. 7, but previously illustrated in FIG. 2) separating one or both fluids belonging to one pixel from those in adjacent pixels. The pixel walls can either extend in height for the entire thickness of the electrowetting fluids (in which case they can also act as cell spacers), or be of intermediate height so that they only restrict the motion of the polar fluid. Intermediate values of reflectivity in between black and white (i.e. grey-levels) can be generated time-sequentially by moving the droplets rapidly between their positions for black and for white reflections, so that when averaged over the response time of the human eye, a reflectivity that is intermediate between black and white is perceived. Alternatively, grey-scales can be generated spatially, by moving the droplet so that it partially covers the base of the light-concentrating structure 16, the fraction depending on the grey-level required. With the electrode structure illustrated in FIG. 7, the grey-levels generated may be asymmetric in viewing angle, because the droplet is drawn towards one side of the light-concentrating structure. In practice, more symmetric viewing angle characteristics will be obtained by arranging more symmetric electrode structures, some examples of which are illustrated in FIGS. 8, 9 and 10, for different types of light-concentrating structures.

Figure 5:
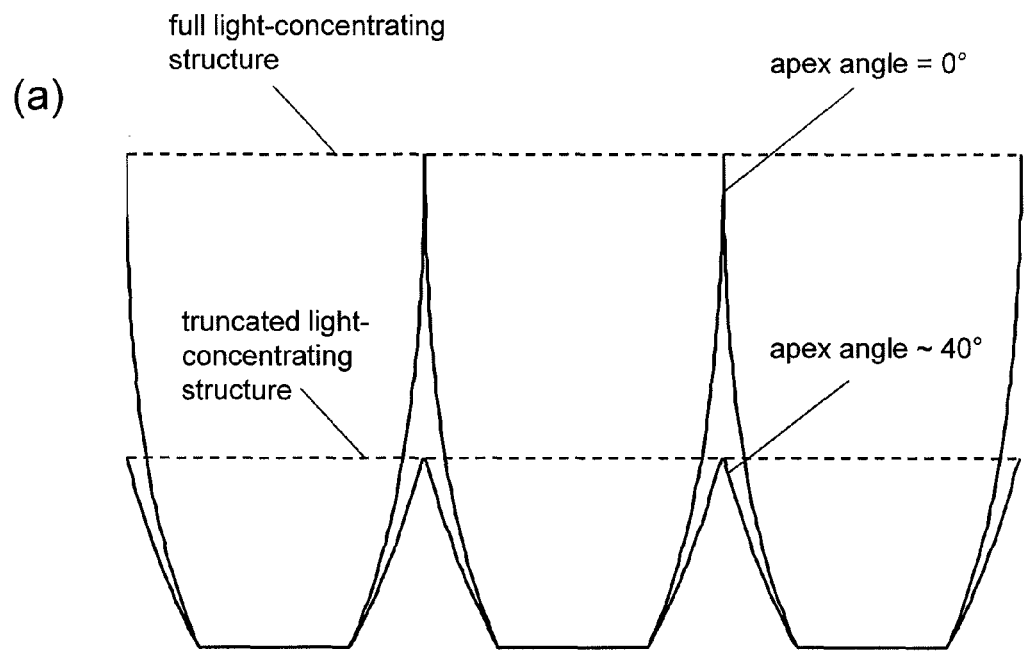
FIG. 5: (a) Shows an example of a truncated light-concentrating cross-section, compared with an un-truncated light-concentrating cross-section, (b) shows an example of a light-concentrating structure with cylindrical symmetry, (c) shows an example of a light-concentrating structure with hexagonal symmetry, (d) shows an example of a light-concentrating structure with square symmetry, (e) shows an example of a two-dimensional light-concentrating structure which is invariant in one direction.
Figure 5:
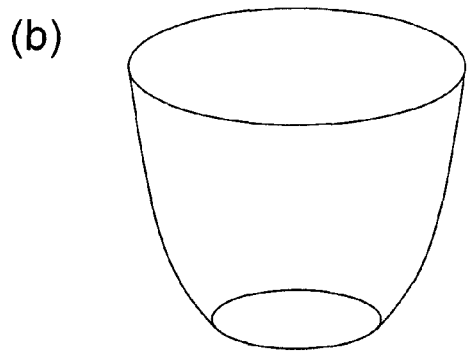
Figure 5:
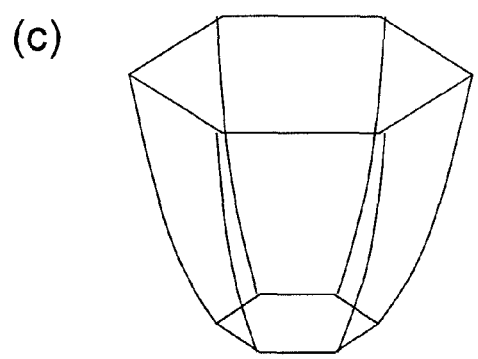
Figure 5:
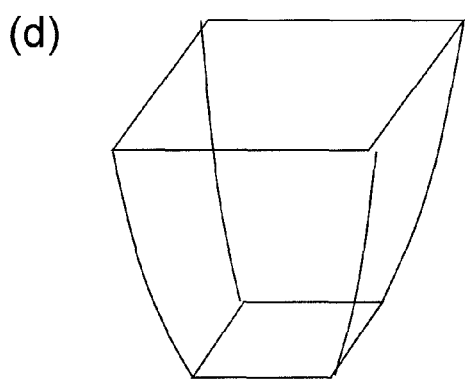
Figure 5:
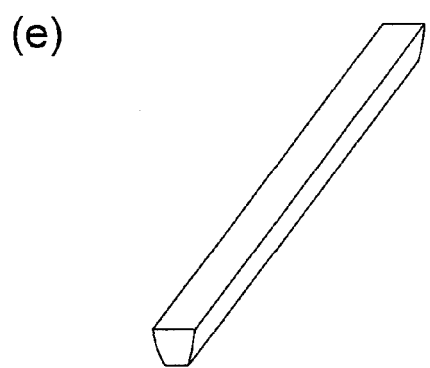
Figure 8:
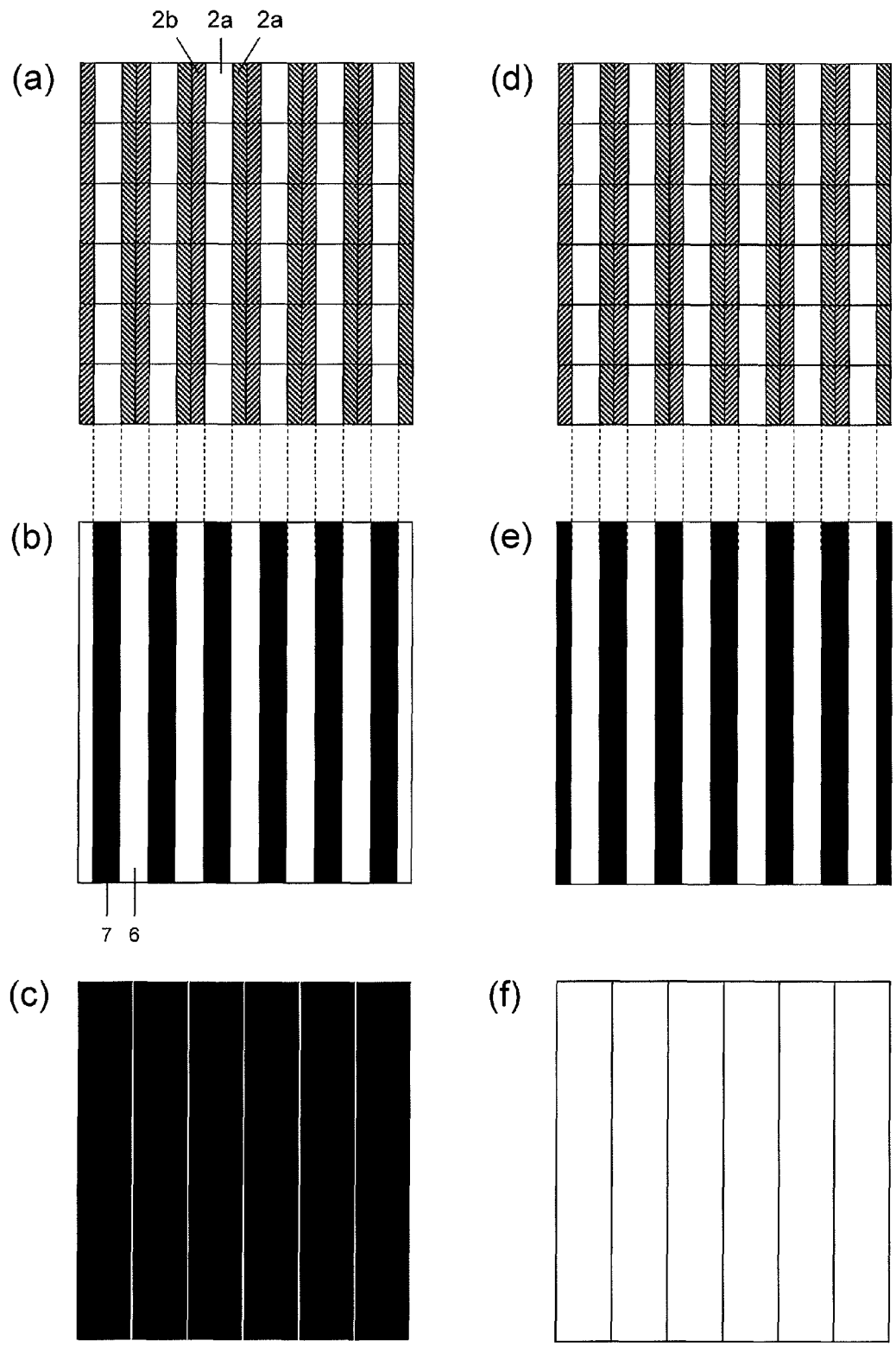
FIG. 8: Plan view of various parts of the preferred embodiment of the invention, in the case that two-dimensional light-concentrating structures are used. (a)-(c) show the electrode layout, the fluid positions and the display appearance, respectively, in the dark state of the display, (d)-(f) show the electrode layout, the fluid positions and the display appearance, respectively, in the bright state of the display.

FIG. 8(*a*) shows an example electrode structure for the case where the light-concentrating structures are two-dimensional (linear or trough-like) such as that shown in FIG. 5(*e*). Each pixel has three electrodes associated with it, a central pad 2*a*, and two outer pads 2*b* and 2*c* on opposite sides of the central pad 2*a*. The pads are connected to control circuitry such as thin-film transistors which control the voltages applied to the three pads, relative to the ground electrode 5, in order to alter a wetting effect of the electro-wetting fluid on the hydrophobic layer(s) included in the light-modulating area of the pixels. Generally, the same voltage will be applied to the side pads 2*b* and 2*c*, in order to generate symmetric droplet motion. And generally, voltage will only be applied to an electrode when it is desired that the black, polar liquid 7 is moved towards that electrode. For example, when a pixel is to be switched into the black state, voltage will be applied to the central pad 2*a*, and not to the side pads 2*b* and 2*c*. Conversely, when a pixel is to be switched into the white state, voltage will be applied to the side pads 2*b* and 2*c*, and not to the central pad 2*a*. FIG. 8(*b*), which is aligned with FIG. 8(*a*), shows the distribution of the black polar fluid 7 and transparent non-polar fluid 6 within the electrowetting fluid layer of the display, in the case where all of the pixels shown are in the black state. FIG. 8(*c*) shows the appearance of the display as viewed from the top (i.e. through the top substrate), in this state, i.e. black everywhere. FIGS. 8(*d*)-(*f*) show the equivalent situation when the pixels are switched to their white state.

Figure 9:
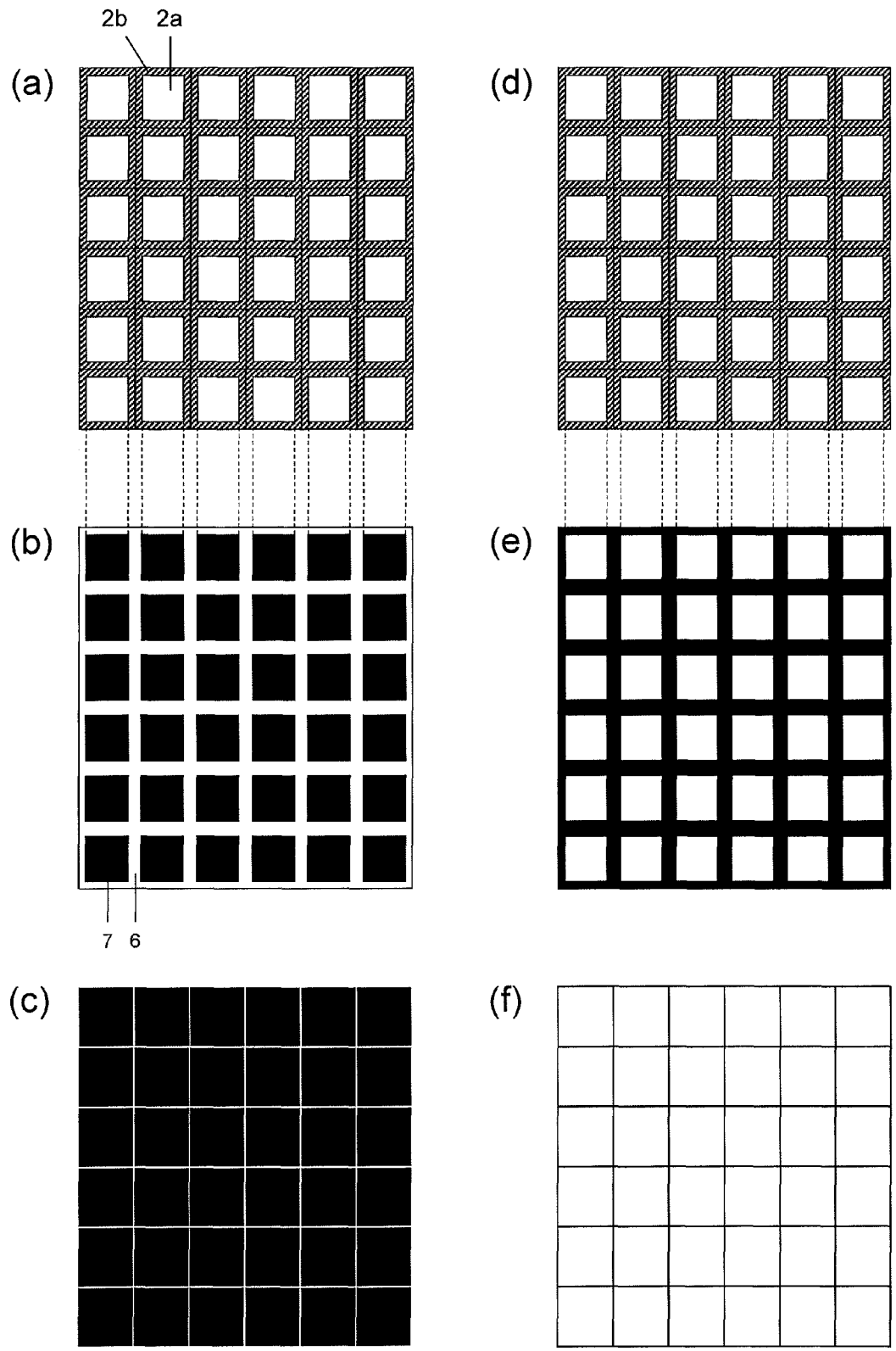
FIG. 9: Plan view of various parts of the preferred embodiment of the invention, in the case that light-concentrating structures with square symmetry are used. (a)-(c) show the electrode layout, the fluid positions and the display appearance, respectively, in the dark state of the display, (d)-(f) show the electrode layout, the fluid positions and the display appearance, respectively, in the bright state of the display.

FIG. 9 is the equivalent to FIG. 8 in the case that square light-concentrating structures are being used (e.g., as shown in FIG. 5(*d*)) instead of two-dimensional light-concentrating structures. As shown in FIG. 9(*a*), in this case, there are just two electrodes per pixel, a central pad 2*a* and an outer pad 2*b*, which completely surrounds the central pad 2*a*. The positions of the black and transparent fluids, relative to the electrodes, for the black and white states, respectively, are shown in FIG. 9(*b*) and (*e*). FIGS. 9(*c*) and (*f*) show the appearance of the display as viewed through the top substrate, i.e. completely black and completely white, respectively. FIG. 10 is the equivalent to FIG. 9 except that hexagonal light-concentrating structures (e.g., as shown in FIG. 5(*c*)) are used instead of square light-concentrating structures.

Figure 10:
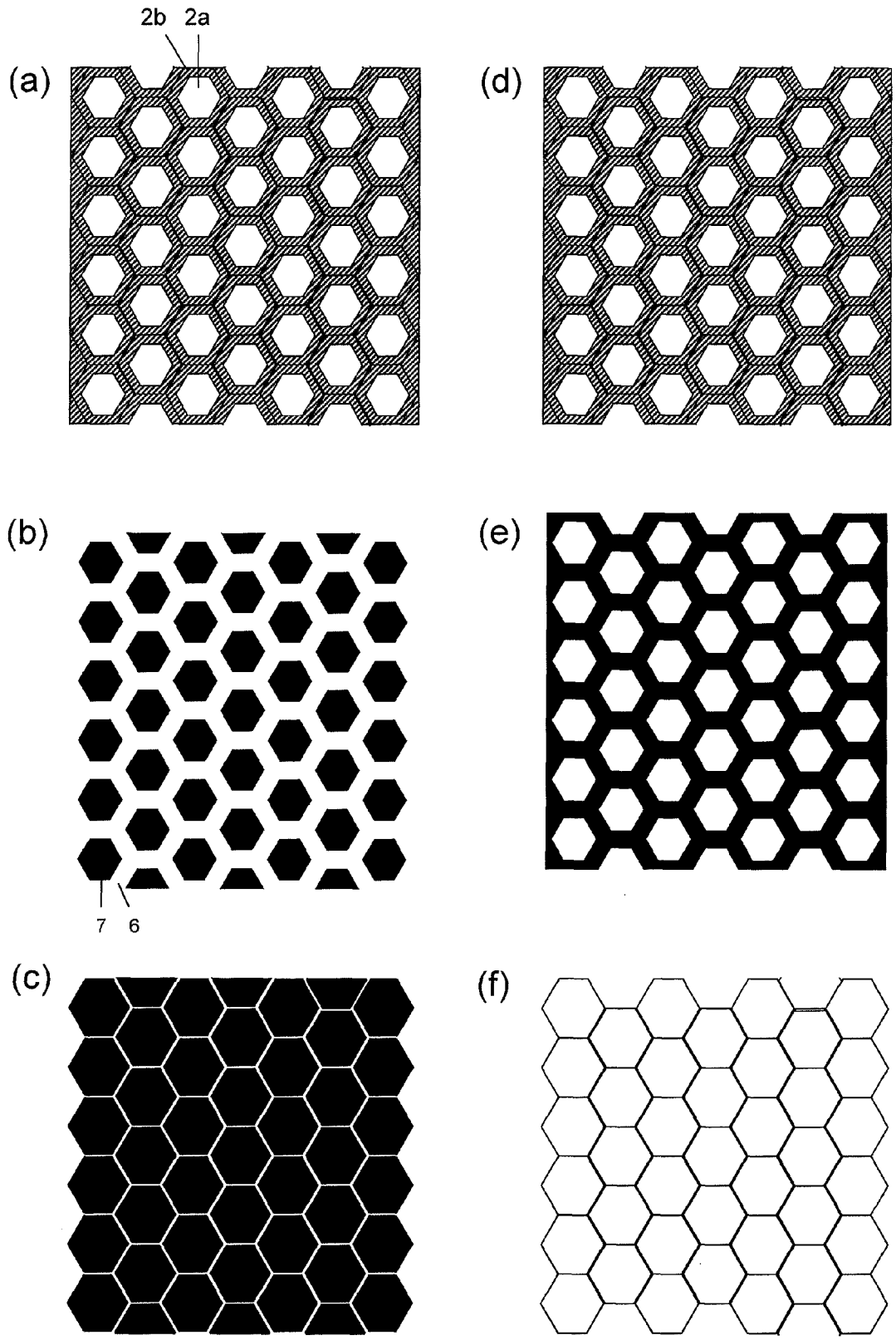
FIG. 10: Plan view of various parts of the preferred embodiment of the invention, in the case that light-concentrating structures with hexagonal symmetry are used. (a)-(c)

The diagrams shown in FIGS. 8-10 are relatively simplified in that they do not show in detail the gaps between the electrodes which must exist in order to provide electrical isolation. In addition, the diagrams do not show the location of pixel walls which may or may not be necessary in order to separate the fluids in adjacent pixels. These walls will generally be co-incident with the gaps between the electrodes in adjacent pixels. In the case of the two-dimensional and square light-concentrating structures (FIGS. 8 and 9), the pixel walls will form a square or rectangular grid, whereas in the case of hexagonal structures (FIG. 10), the pixel walls will form a hexagonal "honeycomb" structure.

In the embodiments described above, there have been two or three electrodes per pixel, which has advantages and disadvantages. The advantage of this arrangement is that the polar fluid droplet should be stable in any position, so that once the required droplet motion has been achieved, the voltage can be removed and there is no restoring force which would make the droplet resume any particular position, i.e. the system is in principle multi-stable. In practice, however, small imperfections within the layers of the device can lead to certain preferences in droplet position, and therefore in practice it may be necessary to use some kind of pixel walls or channels if bi- or multi-stable behavior is required. Another advantage is the symmetry of the switching from black to white, and white to black: they should in principle be very similar because both cases are driven by the electrowetting force. An alternative arrangement, which uses only one electrode per pixel, but will not create a bistable system nor one that switches symmetrically in both directions, is to pattern the hydrophobic layer 4 so that the droplet will have a preferred position within each pixel (the part where there is no hydrophobic layer). This means that it is not necessary to put an electrode underneath this section of the pixel, and the droplet will always return to this position when the voltage is removed. The electrode must be placed under the other portion of the pixel (the part with the hydrophobic later) in order to be able to move the droplet into this position under applied voltage.

In the embodiments described above, the electrowetting scheme used has been that of droplets of a black, polar fluid being moved within a transparent non-polar fluid. The basic principle of optical modulation is that when the light rays each the electrowetting fluid (having been concentrated by the light-concentrating structure), they are either absorbed by the black dye within the polar fluid, or are transmitted through the transparent fluid and reflected back into the light-concentrating structure by a reflective structure. As described previously, the reflective structure could be part of the hydrophobic layer 4, part of the dielectric layer 3, part of the electrodes 2, or an entirely separate layer which is designed for the sole purpose of reflecting light. Whichever of these layers is used to reflect light back into the light-concentrating structure, it is important that that reflective layer is as close to the base of the light-concentrating structure as possible, in order to ensure optimum contrast ratio in the final display. Taking into account the typical thicknesses of the various layers, by far the most important to minimise is the electrowetting fluid layer. This is not so important for the black state, since the black, polar fluid occupies the entire thickness of the electrowetting fluid layer, and hence light absorption begins at the very top of the electrowetting layer, but is more important for the white state, since if the non-polar fluid is transparent, then the light is reflected at some distance from the base of the light-concentrating structure which is at least as large as the thickness of the electrowetting layer. This means that some of the reflected light will not re-enter the same light-concentrating structure, as illustrated in FIG. 11(a). This light will either be lost, or contribute to crosstalk into the neighbouring pixel (if the light can enter the neighbouring light-concentrating structure, as is the case in FIG. 11(a)). Some of this crosstalk can be reduced or eliminated by making sure that the rear reflective element is patterned so that it only corresponds to the bases of the light-concentrating structure, and not to the gaps in between, as shown in FIG. 11(b). If the reflective layer is part of the electrodes, then this is easily implemented since the electrodes are already patterned. All that is required is to make the electrodes which are directly underneath the light-concentrating structure bases reflective (such as flat or bumpy aluminium or silver), and the other electrodes transparent or absorbing (ITO or an absorbing metal such as tungsten, molybdenum or chromium). If, however, the reflective layer is separate from the electrodes, then it may be advantageous to pattern it in order to reduce crosstalk. Whether the rear reflective layer is patterned or not, it is still important that the electrowetting layer is as thin as possible in order to maximise brightness and minimise crosstalk. Other limits placed on the thickness of the electrowetting layer are droplet speed, and obtaining sufficient optical density in the black fluid to absorb all of the light incident: fortunately this can be possible with a layer of just a few microns. An alternative solution which alleviates the need to minimise the electrowetting fluid layer thickness is to use a reflective non-polar fluid instead of a transparent one. This can be achieved by dissolving reflective particles into the non-polar fluid: since the fluid must remain non-polar, this cannot include metallic particles, and the remaining solution is to use dielectric particles suspended in the non-polar fluid, and rely on scattering to create a diffuse reflection. In order to obtain the greatest amount of scattering, the refractive index of the particles should be as different to that of the non-polar fluid as possible. Titanium dioxide ($TiO_2$) particles are very often used for this purpose because of their very high refractive index (~2.5), and have been shown to form stable suspensions in non-polar fluids such as dodecane. As illustrated in FIG. 11(c), if the non-polar fluid acts as the reflector (it is essentially a white fluid), then because the non-polar fluid occupies the entire depth of the electrowetting fluid layer, the scattering process begins right at the very top of the electrowetting fluid layer, and hence there is less need to have a thin electrowetting fluid layer. In fact there will be a minimum thickness of non-polar fluid required in order to obtain a good diffuse reflection. Of course it is possible to combine both of the two extreme cases: if the concentration of scattering particles in the non-polar fluid, and the thickness of the non-polar fluid are insufficient to scatter all of the incident light before it reaches the lower substrate, then a fixed reflective layer could be used to reflect any remaining light.

In the embodiments described above, the electrowetting mode described has been that of droplets of a black, polar fluid which move within a transparent or scattering non-polar fluid. However, the optical properties of the fluids can easily be reversed in this mode. In this mode, it will always be the non-polar fluid which moves within the polar fluid. However, it can be the non-polar fluid which is dyed black, and the polar fluid which is transparent or reflective. In this case where it is the polar fluid that is reflective, then it is possible to use metallic particles suspended within the polar fluid or even a liquid metal such as mercury. Dielectric particles can also be used as before.

Figure 1:
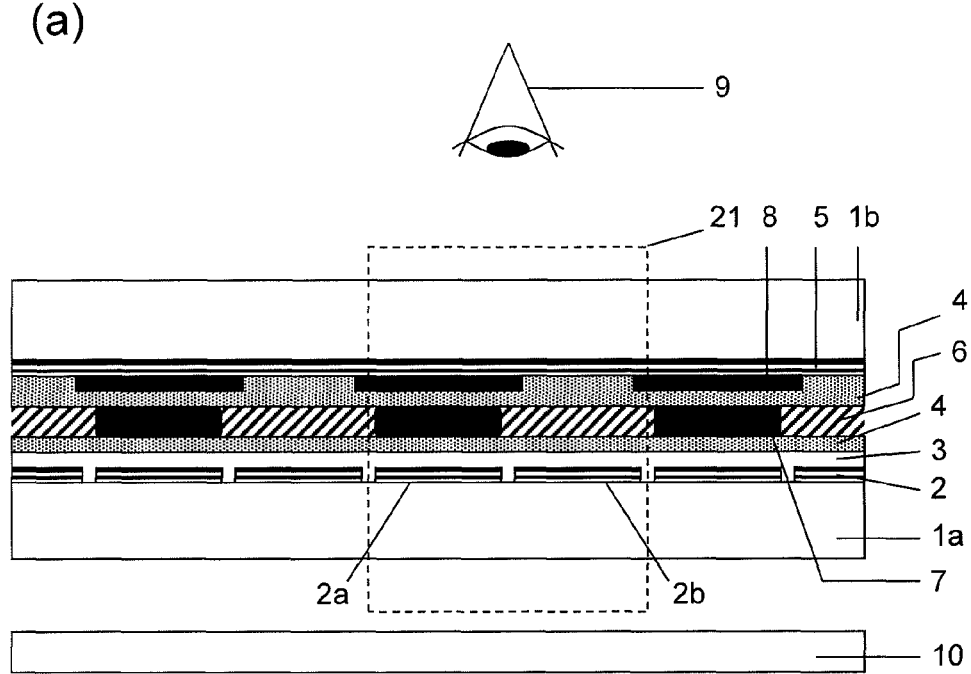
FIGS. 1(a) and 1(b): Illustrate the principle of operation of a first type of conventional single layer electrowetting device
Figure 1:
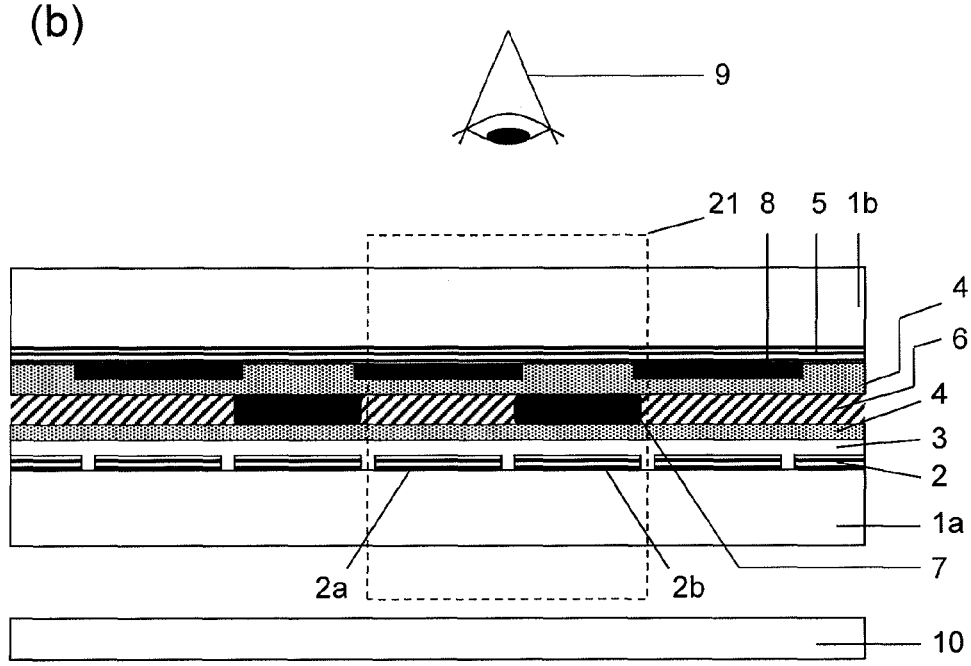
Figure 2:
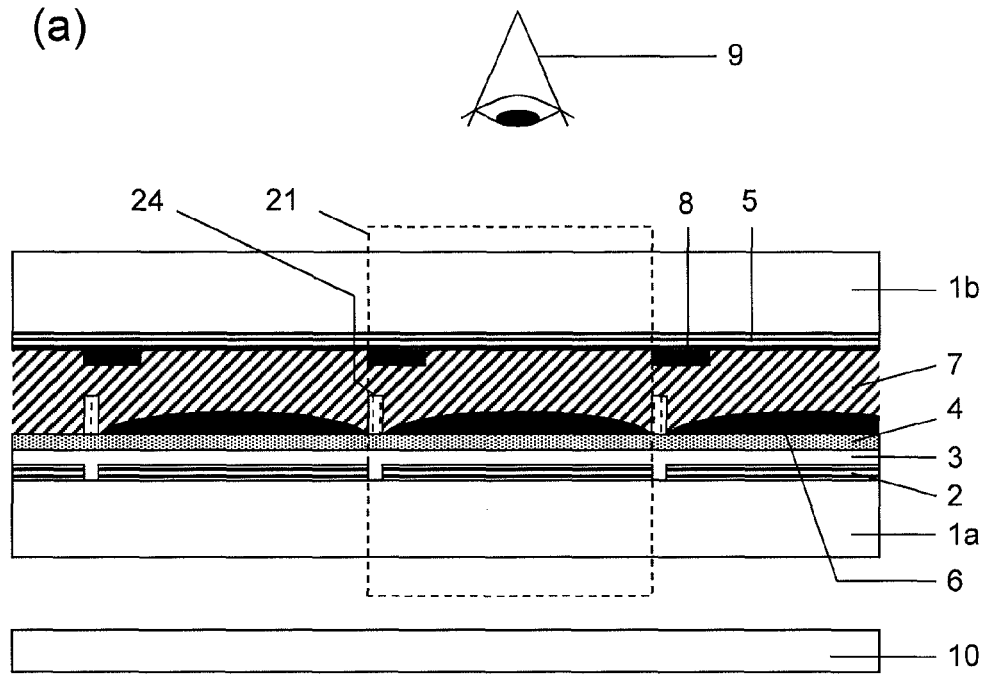
FIGS. 2(a) and 2(b): Illustrate the principle of operation of a second type of conventional single layer electrowetting device
Figure 2:
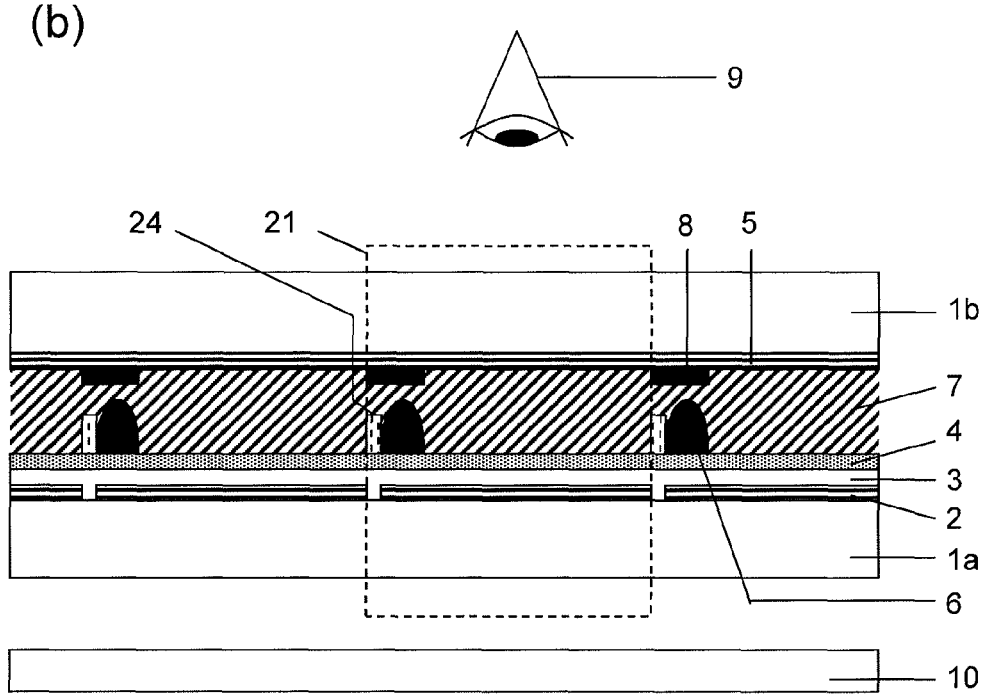

In another embodiment of this invention, the electrowetting mode illustrated in FIG. 2 is used. In this mode, the polar fluid is transparent, and the non-polar fluid is black. The polar fluid cannot be reflective because it is always visible, and hence this mode relies on a rear reflective layer. It is therefore necessary to use as thin an electrowetting fluid layer as possible, for the reasons discussed above. However, this electrowetting mode requires a thicker electrowetting fluid layer than the mode illustrated in FIGS. 1 and 7, because when the voltage is applied, there must be sufficient height to allow the non-polar fluid to increase in height (and therefore consolidate to occupy less area within the plane of the display, since the volume is constant). Therefore, this mode is rather less suited to this invention that the first mode. However, it does have the advantage that only one electrode is needed per pixel, as illustrated in FIGS. 12(a) and 12(b) which show the black and white states in the case that this mode is applied to this invention.

Alternatively, in order that a reflective (rather than transmissive) fluid can be used as the polar fluid, the substrate surfaces can be reversed (so that the top substrate now has the individual electrodes 2, the dielectric layer 3 and the hydrophobic layer 4) as shown in FIG. 13 so that in the voltage-off state (FIG. 13(a)), the black, non-polar fluid 6 is in contact with the bases of the light-concentrating structures 16. When the voltage is applied as shown in FIG. 13(b)), the black, non-polar fluid 6 moves to one side, and the reflective, polar fluid 7 is revealed. This arrangement has the difficulty that the electrodes 2 are now on the light-concentrating substrate 1c, which means that if the display is to be active matrix driven, then there must be a thin-film-transistor (TFT) array on the light-concentrating substrate 1c. The TFTs could be positioned on the surface of the light-concentrating substrate 1c in between the bases, but there may be difficulties associated with processing TFTs on the light-concentrating substrate due to the high temperatures that are commonly required.

A further variant on this option is possible in the case that a reflective (rather than refractive, and therefore opaque) boundary is used for the curved light-concentrating surfaces (e.g., first and second sides 13 and 14), and the light-concentrating structures have not been planarised to form a flat light-concentrating substrate as previously described. In this case, it is possible for one of the fluids to move into the gaps between the light-concentrating structures, without being seen by the observer. This is illustrated in FIG. 14, which shows one possible arrangement of electrodes 2, dielectric layer 3 and hydrophobic layer 4, which would allow this possibility. In this arrangement, when a voltage is applied between the electrodes 2 and the uniform electrode 5, the polar fluid 7 wets the base of the light-concentrating structures, and hence the black non-polar fluid 6 is pushed away to the vertical recesses between the bases of the light-concentrating structures, where it is hidden from view as represented in FIG. 14(b). This embodiment has the advantage that the thickness of the electrowetting layer underneath the light-concentrating structures does not need to be as large as in the simple planar case shown in FIGS. 12 and 13, and hence in the case where a transparent polar fluid is used, the rear reflector can be positioned much closer to the base of the light-concentrating structures, resulting in much better performance. Alternatively, a reflective polar fluid could be used as described above. This embodiment is very particular to the use of electrowetting as the display mode beneath the light-concentrating structures, because it involves the non-planar motion of the electro-wetting fluid into the vertical recesses between the adjacent light-concentrating structures. This embodiment could not, for example, be applied to an in-plane MEMS electro-optic modulator, as could be imagined for previous embodiments.

In a further embodiment of this invention, the electrowetting mode used is one of those disclosed in WO2009/036272 A1, which is very similar to the most simple electrowetting mode illustrated in FIGS. 1 and 7, except that the fluid which is not visible to the viewer is "hidden" in a vertical reservoir, in order to improve the aperture ratio of the display, as explained above. FIG. 15 shows a possible device structure which would achieve this electrowetting geometry. On top of the lower substrate 1a are constructed some "mesa" structures 22, which, like the light-concentrating structures, can be made from the same material as the lower substrate 1a, or a different material. A simple approach would be to manufacture the mesa structures 22 from a high-aspect ratio photoresist such as SU8. The dimensions of the mesa structures 22 will be consistent with those of the light-concentrating structures 16 such that the tops of the mesa structures 22 are coincident with the corresponding light-modulating areas of the pixels. If the light-concentrating structures 16 are two dimensional, then so are the corresponding mesa structure 22. On-top of the mesa structures 22 are electrodes 2, which again can be part of a passive or active matrix. As in previous embodiments, on-top of the electrodes 2 is a dielectric insulating layer 3 and a hydrophobic layer 4. The dielectric insulating layer 3 can coat the sides of the mesa structures 22, but it is important that the hydrophobic layer 4 does not do so. As previously, there must be a reflective layer (not shown) positioned somewhere underneath the electrowetting fluids 6,7. The upper substrate 1b is as in FIG. 7, i.e. part of a light-concentrating substrate 1c, with a continuous uniform electrode 5 and a hydrophobic layer 4. The gaps between the mesa structures 22 form vertical reservoirs underneath the space between the bases of the light-concentrating structures of adjacent pixels which provide for non-planar motion of the electro-wetting fluid between the mesa structures of the adjacent pixels. Since the sides of the mesa structures 22 do not have a hydrophobic coating, in the undriven state (FIG. 15(a)), the polar fluid 7 lies within the vertical reservoirs, and in the case where the polar fluid is black, this corresponds to the bright state of the display. When a voltage is applied between the electrodes 2 and the uniform electrode 5, the polar fluid 7 moves so that it occupies the space directly underneath the light-concentrating structures 16, so that the dark state is achieved (as illustrated in FIG. 15(b)). In order to provide a channel for the non-polar fluid 6 to enter the vertical reservoir in this case, a "duct" through the mesa structure 22 is provided (not shown) in order to allow the free flow of the fluids 6,7 under the influence of the electrowetting force.

It would also be possible to create an alternative version of this embodiment in which there are vertical electrodes, dielectric layers and hydrophobic layers on the sides of the mesa structures 22, in order to provide an active drive mechanism to move the polar fluid back into the vertical reservoir, instead of relying on the restoring force provided by the lack of hydrophobic layer in the above embodiment. However, this version is more difficult to manufacture.

In a further embodiment of the invention, the electrowetting mode used is one of those disclosed in U.S. Pat. No. 7,359,108 B2, which is very similar to that described in the last embodiment and illustrated in FIG. 15, except that the fluid that is not to be seen by the viewer is "hidden" in a horizontal reservoir instead of a vertical reservoir, as illustrated in FIG. 16. There are multiple ways in which this kind of electrowetting mode can be achieved, and this invention is not restricted to the particular arrangement illustrated in FIG. 16. Here, there are effectively three electrodes per pixel. Two of them, 2a and 2b, which are on the upper and lower substrates, will vary in voltage according to the required pixel brightness. The third or separator electrode 23 is in between the two fluid layers and acts as both a physical separator and a common electrode (most conveniently ground) which is in electrical contact with all of the polar fluid droplets. In FIG. 16, all of the electrode surfaces are coated with a hydrophobic coating 4, and hence the position of the droplet is determined by which electrode (upper electrode 2a or lower electrode 2b) a voltage has most recently been applied to, i.e. the system is bistable. For example, if a voltage is applied between the separator electrode 23 and an upper electrode 2a, the polar fluid droplet 7 as represented in FIG. 16(a) will move to the upper level so that it is above the separator electrode 23, and next to the base of the light-concentrating structure 16, so that the pixel appears black (in the case that the polar fluid 7 is black). On the other hand, if a voltage is applied between the separator electrode 23 and the lower electrode 2b, the polar fluid droplet 7 as represented in FIG. 16(b) will move to the lower level so that it is below the separator electrode 23 and hidden from view. The pixel will therefore appear white, provided that the separator electrode 23 is reflective.

All of the embodiments so far have related to reflective displays, i.e. displays in which the origin of the light reaching the viewer is the ambient light. This is achieved by making the pixels reflective rather than transmissive, either by using transparent and black electrowetting layers with a rear reflector behind, or by using reflective and black electrowetting fluids. In the first case, the rear reflector can be all or part of the electrode on the rear substrate, or it can be integrated into either the dielectric or hydrophobic layers on-top of the electrode (or any combination of those two extremes), or all three (electrode, dielectric, hydrophobic) layers can be transparent, and a rear reflector placed underneath.

All of the embodiments described so far except the last (the one illustrated in FIG. 16) can also be applied to improve the efficiency of transmissive electrowetting displays. In order to do achieve this, all the layers referred to in the previous paragraph must be transparent, or substantially transparent, including the electrodes, which must be made from a transparent conductor such as ITO. In this transmissive case, light-concentrating structures ideally are used on both substrates, as illustrated in FIG. 17(a). The first light-concentrating substrate 1c and a second light-concentrating substrate 1c' are arranged on opposite sides of the array of pixels and are each configured to concentrate light onto the light-modulating area of a corresponding one or more pixels within the array of pixels. In a transmissive display, the origin of the light reaching the viewer is primarily from the backlight 10 placed behind the display. Therefore, in order to use light-concentrating structures to concentrate the light incident on the rear surface of the display through the useful aperture of the pixels, the light-concentrating structures must be incorporated into the rear substrate of the display, as shown in FIG. 17(a). It might be thought that this on its own would be enough to improve the efficiency of the display, because almost all of the incident light from the backlight would be concentrated through the pixel apertures. However, the effect of the light-concentrating structures on the angular distribution of light must be borne in mind here. As is consistent with the principles of etendue, if the area of illumination is decreased (by focussing through pixel apertures), then the angular distribution must increase. The initial angular distribution of light entering the light-concentrating structures is that within a cone with a half angle determined by the refractive index of the light-concentrating structure $n_{LCS}$:

$$\theta_{LCS} = \sin^{-1}\left(\frac{1}{n_{LCS}}\right)$$

As the light exits the light-concentrating structure, the angular distribution of light will again be a cone, this time with a greater half angle. As is immediately apparent from FIG. 17(b), if there is no second light-concentrating structure after the pixel aperture, then much of this cone of light will not be able to escape the final surface of the display, because those rays of light which are at an angle greater than $\theta_{LCS}$ will be totally internally reflected. The ideal situation is if there is the second light-concentrating substrate 1c' including the lower substrate (not shown) of the display with identical characteristics to that of the first light-concentrating substrate 1c including the upper substrate (not shown), as shown in FIG. 17(a). This transmissive embodiment can be applied to all three of the electrowetting modes illustrated in FIGS. 7, 12, 13, 14, and 15, but not FIG. 16. The reason for this is that in the first listed embodiments, the electrowetting mode provides a switch that can be from absorbing to transmitting, if transparent and black fluids are used. However, the embodiment illustrated in FIG. 16 is always absorbing in transmission, because the black fluid is always horizontal. Embodiments in which the two electrowetting fluids are reflective and black, instead of transparent and black, do not apply to the transmissive cases.

However, a transflective display can be realised by using three electrowetting fluids, as illustrated in FIG. 18. In this embodiment, there are two sets of light-concentrating substrates 1c and 1c', one on the rear and one on the front, and each including an array of light-concentrating structures 16. As previously described, the purpose of the light-concentrating substrate 1c' including the lower substrate 1a is to concentrate light from the backlight (not shown) into the pixel apertures. The purpose of the light-concentrating structures 16 on the upper substrate 1c is two-fold. Firstly, they will concentrate ambient light onto the pixel apertures. Secondly, they will redirect light emerging from the pixel apertures (whether transmitted through the pixel from light originating from the backlight, or reflected by the pixel originating from the ambient light) so that it emerges from the front surface of the display without undergoing TIR (as explained above). Within the electrowetting fluid layer, there are two non-polar fluids 6 and 6' (one black, the other reflective, respectively) and one polar fluid 7 (transparent). The electrowetting geometry used most resembles that illustrated in FIGS. 12 and 13, except that the black non-polar fluid 6 is positioned on the upper surface in the voltage off state, and the reflective non-polar fluid 6' is positioned on the lower surface in the voltage off-state. The purpose of the black fluid 6 is to form an image, as previously, and the purpose of the reflective fluid 6' is to provide the option (in any one pixel, or uniformly across the entire display) for the pixel (or entire display) to be reflective or transmissive. This of course means that there must be electrodes for both top and bottom substrates, in order to control the top and bottom fluids independently, and that the polar fluid 7 must be kept at a uniform potential (such as ground) in some way. For example, the polar fluid 7 may be an electrically conductive fluid whose potential is controlled via one or more dedicated electrodes as described in U.S. application Ser. No. 12/637,846 filed on Dec. 15, 2009, the entire contents of which are incorporated herein by reference.

It is emphasised here that in either the case of a transmissive display, or a transflective display, it is very important to have light-concentrating structures incorporated into the upper substrate 1b, so that light emerging from the pixel (either in transmission or reflection) towards the viewer is collimated so that rays incident on the refractive boundary between the top of the upper substrate 1b, and the surrounding medium (usually air) strike the boundary at angle less than the critical angle so that they can emerge from the display and be viewed by the viewer, as shown in FIG. 17(a). Without the upper light-concentrating structures, some of these rays will be totally internally reflected as shown in FIG. 17(b) and therefore will not immediately emerge from the display, resulting in a dimmer display image.

In FIG. 18(a), for example, there is no voltage applied between the polar fluid 7 and the rear electrodes 2, so that the polar fluid 7 does not wet the bases of the light-concentrating structures 16 of the rear light-concentrating substrate 1c', and therefore it is the reflective non-polar fluid 6' that is in contact with the rear light-concentrating structures 16. This blocks the light from the backlight, but acts as a rear reflector to ambient light entering the display through the upper light-concentrating substrate 1c. The positions of the droplets of black non-polar fluid 6 will depend on the image desired, and in FIG. 18(a), two dark pixels either side of a bright pixel are shown as an example. Therefore, in this mode, the display acts as a reflective display. In FIG. 18(b), however, a voltage has been applied between the polar fluid 7 and the rear electrodes 2, so that the polar fluid 7 wets the bases of the light-concentrating structures 16 of the rear light-concentrating substrate 1c'. This means that the reflective fluid 6' is pushed to one side, allowing light from a rear back-light to pass through the display: the display is now in transmissive mode. Of course, as explained above, all electrodes must be transparent here, and there are no additional reflective layers: the reflective non-polar fluid 6' is the reflector in the reflective mode (using suspended particles of $TiO_2$, or similar, as described above). Also, if it is simply required that the entire display is either uniformly reflective or uniformly transmissive (as may very well be the case), then it is not necessary to have individual electrodes 2 on the rear light-concentrating substrate 1c': these could simply be replaced with a uniform rear electrode (not shown).

The previous embodiment has described a method by which a display which is switchable between being back-lit transmissive and reflective. There may be some disadvantages associated with this design. Firstly, there are two light-concentrating substrates 1c and 1c', and secondly, there needs to be some kind of decision (made either automatically via a sensor, or manually) about which mode to operate the display in. An alternative which solves this problem is to use a purely reflective display, as previously described, but to add a front-light onto the top of the display. This front-light could be an additional component added on top of the upper substrate 1b, or form part of the upper substrate 1b.

So far, the displays described have been concerned with the modulation of the intensity of ambient, backlight and front light illumination, and therefore are suitable for forming monochrome (black and white) displays. In order to create colour displays, colour filters can be added to the displays in much the usual way, although some care needs to be taken in the positioning of the colour filter within the display structure. The most convenient arrangement is to have one light-concentrating structure per colour sub-pixel. The colour sub-pixels could be any combination of additive colours, e.g. red, green and blue (RGB), or red, yellow, green and blue (RGBY), or red, green, blue, white (RGBW). In practice, the choice of colour sub-pixels will be a trade-off between achieving saturated colours, and achieving good reflectivity in the white state. For reflective displays, the white state brightness tends to be comparatively more important than colour saturation, or indeed the brightness of colour images, when compared with transmissive displays. This is because we are used to seeing coloured images printed on white paper, where the reflectivity of the primary colours red, green and blue are far lower than ⅓ of the reflectivity of the white background. This being the case, opting for an RGBW colour scheme is usually preferable to a classic RGB scheme which is commonplace in transmissive displays. Examples of RGB and of RGBW colour sub-pixel arrangements for hexagonal, square and two-dimensional light-concentrating structure arrays are illustrated in FIG. 19(a)-(c). In these cases, the position of the colour filters within the display structure is fairly arbitrary, so long as it is above the reflector (be that the rear electrode or otherwise). Bearing in mind the desire to minimise the distance between the bases of the light-concentrating structures and the rear reflector, it is tempting to place colour filters 35 between the substrate 1b and the light-concentrating structures 16, as shown in FIG. 20(a). However, this means that the light-concentrating structures 16 cannot be fabricated directly into the substrate material 1b, and must be created within a second layer deposited on-top of the colour filters. The light-concentrating structures then need to be aligned with the colour filters which may be difficult, depending on the manufacturing method used. And finally, the tops of the light-concentrating structures 16 made must coincide exactly with the colour filters, otherwise there could be parallax issues which would lead to colour de-saturation. An alternative is to use the light-concentrating structures themselves as colour filters, i.e. light-concentrating structures 16' could be fabricated in a photoresist that is also a colour filter, as shown in FIG. 20(b). Otherwise, the colour filters can be placed anywhere on the surfaces of the light-concentrating substrate or rear substrate (so long as it is above the reflector). In the cases of three-dimensional light-concentrating structures, the patterning of the colour filters will be on the lattice as that of the light-concentrating structures. This must also be the case for two-dimensional light-concentrating structures in the cases that the colour filters are above the light-concentrating structures or are the light-concentrating structures. If the colour filters are beneath the bases of the light-concentrating structures, then it is no longer necessary that the colour filter array matches that of the light-concentrating structures, i.e. they do not have to be striped, as shown in FIG. 19(c), instead, an arrangement such as that shown in FIG. 19(b) for a square array can be used, or a rectangular array such as shown in FIG. 19(d). The reason is that if the colour filters are close to the electrowetting fluids, then parallax is not a problem and greater freedom in designing the colour filter layout is allowed.

Alternatively, the reflectors could act as the colour filter, i.e. by reflecting either red, green or blue light, and transmitting the rest. Such a colour filter can be made using a thin-film interference stack, and could (for example) form part or all of the dielectric layer 3. A further alternative is that instead of having transparent and black fluids with a rear reflector and colour filters, the reflection is achieved by one of the fluids. This aspect was introduced in a previous embodiment, with the use of reflective and black fluids (which can be combined with standard colour filters, as above). However, in this embodiment, there is a combination of either coloured and transparent fluids (with a rear absorber) or coloured and black fluids. In this case, the coloured fluid needs to reflect strongly a certain colour (e.g. red, green or blue), in much the same way that was discussed for the reflective fluid in previous embodiments. It would not be appropriate for the fluid simply to transmit some wavelengths and absorb the rest.

FIGS. 21(a)-21(d) are block diagrams showing various types of display systems incorporating a display with light concentrating structures as described herein. For example, FIG. 21(a) shows a reflective display system 26 incorporating a reflective display 25. The reflective display 25 may be made up of any of the configurations described above in relation to FIGS. 7 and 12-16, for example, and relies on the reflection of ambient light 28. A controller 27 provides image data to the pixels of the display 25 by virtue of the voltages applied to the respective electrodes so as to display a desired image as will be appreciated. In FIG. 21(b), a transmissive display system 30 is shown. The system 30 utilizes a transmissive display 29 having a construction such as that described above in relation to FIG. 17(a). Also included in the system 30 is a backlight 10. The controller 27 again provides the appropriate voltages to the pixels in the display in order to display images as desired. The backlight 10 provides the necessary backlighting.

FIG. 21(c) illustrates a transflective display system 32 using a transflective display 31 such as that described above in relation to FIG. 18. In such case, the display system 32 utilizes both a backlight 10 and ambient light 28. FIG. 21(d) illustrates a front-lit reflective display system 33 having a reflective display 25 similar to the reflective display system 26, and further including a front light 34.

As will be appreciated, the present invention may be incorporated in any of a variety of types of display systems. The particular displays described herein are intended merely to be exemplary.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The display outlined in this invention can be reflective, transmissive, transflective, or front-lit reflective. It can be monochrome or colour, and it can either be bistable or fast-switching for video rate applications. It therefore can be applied to displays in just about any application, e.g. mobile

The invention claimed is:

1. A display, comprising:
an array of pixels, each pixel including:
a hydrophobic layer;
an electro-wetting fluid adjacent the hydrophobic layer, the electro-wetting fluid comprising at least first and second fluids immiscible with each other and having different polar properties and different optical properties; and
at least one electrode wherein application of a voltage to the electrode alters a wetting effect of the electro-wetting fluid on the hydrophobic layer in a light-modulating area of the pixel; and
a light-concentrating substrate comprising an array of light-concentrating structures each configured to concentrate light onto the light-modulating area of a corresponding one or more pixels within the array of pixels.

2. The display according to claim 1, wherein:
a base of each light-concentrating structure defines the light-modulating area of the corresponding one or more pixels within the array of pixels, and
the at least one electrode is configured to control whether at least one of the first and second fluids is positioned within the light-modulating area of the pixel or in a space between the light-modulating area of the pixel and the light modulating area of an adjacent pixel.

3. The display according to claim 1, wherein a voltage applied to the at least one electrode causes lateral motion of the first and second fluids between the light-modulating areas of the pixel or the space between the light-modulating area of the pixel and the light modulating area of an adjacent pixel.

4. The display according to claim 1, wherein a voltage applied to the at least one electrode causes one of the first and second fluids to consolidate by occupying less area within the plane of the display in the light-modulating area.

5. The display according to claim 1, wherein a space between the base of each light-concentrating structure and the base of an adjacent light-concentrating structure within the array of light-concentrating structures comprises a vertical recess providing for non-planar motion of the electro-wetting fluid of corresponding pixels between the adjacent light-concentrating structures.

6. The display according to claim 1, wherein:
the pixels each include a mesa structure at the top of which is the light-modulating area, and a vertical reservoir is formed by a gap between the mesa structure and a mesa structure of an adjacent pixel within the array of pixels; and
the gap between the mesa structures of the adjacent pixels is located directly underneath the space between the bases of the light-concentrating structures corresponding to the adjacent pixels, and provides for non-planar motion of the electro-wetting fluid between the mesa structures of the adjacent pixels.

7. The display according to claim 1, wherein the light-concentrating structures are two-dimensional light-concentrating structures shared by the pixels along a respective row or column.

8. The display according to claim 1, wherein the light-concentrating structures are made from a first material having a first refractive index surrounded by a second material having a second refractive index lower than the first refractive index, and the light-concentrating structures rely primarily on total internal reflection to concentrate the light.

9. The display according to claim 1, wherein the light-concentrating structures are compound parabolic concentrators.

10. The display according to claim 9, wherein the compound parabolic concentrators are truncated.

11. The display according to claim 1, the light-concentrating substrate representing a first light-concentrating substrate, and further comprising a second light-concentrating substrate including another array of light-concentrating structures each configured to concentrate light onto the light-modulating area of a corresponding one or more pixels within the array of pixels from a side of the array of pixels opposite the first light-concentrating substrate.

12. The display according to claim 11, wherein the electro-wetting fluid includes a third fluid with optical properties different from the first and second fluids, and the at least one electrode in each pixel is configured to switch the display between transmissive and reflective operation.

13. The display according to claim 1, wherein the light-concentrating structures are made of material serving as a color filter for the display.

14. A display, comprising:
an array of pixels; and
a light-concentrating substrate comprising an array of two-dimensional light-concentrating structures each configured to concentrate light onto light-modulating areas of corresponding pixels within the array of pixels,
wherein the array of pixels is arranged in rows and columns, and the two-dimensional light concentrating structures have a cross-section that is invariant in one direction and thereby shared by pixels along a respective row or column.

15. A display, comprising:
an array of pixels; and
a light-concentrating substrate comprising an array of two-dimensional light-concentrating structures each configured to concentrate light onto light-modulating areas of corresponding pixels within the array of pixels, wherein:
each pixel comprises:
a hydrophobic layer;
an electro-wetting fluid adjacent the hydrophobic layer, the electro-wetting fluid comprising at least first and second fluids immiscible with each other and having different polar properties and different optical properties; and
a central pad electrode and two outer pad electrodes on opposite sides of the central pad electrode, wherein application of a voltage to the central and outer pad electrodes alters a wetting effect of the electro-wetting fluid on the hydrophobic layer in the light-modulating area of the pixel.

16. A display, comprising:
an array of pixels; and
a light-concentrating substrate comprising an array of light-concentrating structures each configured to concentrate light onto the light-modulating area of a corresponding one or more pixels within the array of pixels,
wherein the light-concentrating structures are made from a first material having a first refractive index surrounded by a second material having a second refractive index lower than the first refractive index, and the light-concentrating structures rely primarily on total internal reflection to concentrate the light.

17. The display according to claim 16, wherein the light-concentrating structures are compound parabolic concentrators.

18. The display according to claim 16, wherein the first refractive index is substantially equal to 1.5.

19. A display, comprising:
an array of pixels; and
a light-concentrating substrate comprising an array of truncated compound parabolic concentrators each configured to concentrate light onto light-modulating areas of corresponding pixels within the array of pixels.

20. The display according to claim 19, wherein the truncated compound parabolic concentrators are made from a first material having a first refractive index surrounded by a second material having a second refractive index lower than the first refractive index, and the truncated compound parabolic concentrators rely primarily on total internal reflection to concentrate the light.

21. A display, comprising:
an array of pixels;
a first light-concentrating substrate arranged on one side of the array of pixels and comprising a first array of light-concentrating structures each configured to concentrate light onto the light-modulating area of a corresponding one or more pixels within the array of pixels; and
a second light-concentrating substrate arranged an opposite side of the array of pixels and comprising a second array of light-concentrating structures each configured to concentrate light onto the light-modulating area of a corresponding one or more pixels within the array of pixels.

22. The display according to claim 21, wherein:
the display comprises a backlight;
the second light-concentrating substrate is configured to concentrate light from the backlight onto the light-modulating areas of the pixels within the array of pixels; and
the first light-concentrating substrate is configured to collimate light from the backlight transmitted through the light-modulating areas of the pixels toward a viewer.

23. The display according to claim 21, wherein the display is configured to be switched between transmissive and reflective operation.

* * * * *